(12) United States Patent
Homsi et al.

(10) Patent No.: US 10,848,064 B2
(45) Date of Patent: *Nov. 24, 2020

(54) UNIVERSAL INPUT-VOLTAGE—COMPATIBLE SWITCHED-MODE POWER SUPPLY

(71) Applicant: EcoSense Lighting Inc., Los Angeles, CA (US)

(72) Inventors: Mustafa Homsi, Los Angeles, CA (US); Chris Strickler, Mission Viejo, CA (US)

(73) Assignee: ECOSENSE LIGHTING INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,819

(22) Filed: Oct. 14, 2019

(65) Prior Publication Data
US 2020/0186037 A1    Jun. 11, 2020

Related U.S. Application Data

(63) Continuation of application No. 16/134,434, filed on Sep. 18, 2018, now Pat. No. 10,483,850.

(60) Provisional application No. 62/560,183, filed on Sep. 18, 2017.

(51) Int. Cl.
*H02M 3/158* (2006.01)
*H05B 45/37* (2020.01)

(52) U.S. Cl.
CPC ....... *H02M 3/1582* (2013.01); *H02M 3/1584* (2013.01); *H05B 45/37* (2020.01)

(58) Field of Classification Search
CPC .............. H02M 3/1582; H02M 3/1584; H05B 33/0815
See application file for complete search history.

(56) References Cited

U.S. PATENT DOCUMENTS 10,483,850 B1 * 11/2019 Homsi ................ H02M 3/1582

\* cited by examiner

*Primary Examiner* — Adolf D Berhane
*Assistant Examiner* — Afework S Demisse
(74) *Attorney, Agent, or Firm* — Jay M. Brown

(57) ABSTRACT

Switched-mode power supply (SMPS) integrated circuit including direct current step-down converter, switch, and element for potential energy storage in electric field and having T-On voltage. SMPS configured to: receive DC input current and output through load; operate in boundary conduction mode applying pulse-width-modulated voltage to switch for controlling T-On/T-Off duty cycle; generate regulated T-On current setting maximum T-On; monitor input voltage by reduction to voltage signal range; convert signal voltage to signal current value within current signal range; output T-On modulation current including signal current; combine T-On modulation current with regulated T-On current during T-On period to store potential energy in element while monitoring T-On voltage of element; and initiate T-Off period when potential energy stored in element reaches maximum T-On voltage. Further SMPS's. Method of operating SMPS's.

33 Claims, 4 Drawing Sheets

US 10,848,064 B2

UNIVERSAL INPUT-VOLTAGE—COMPATIBLE SWITCHED-MODE POWER SUPPLY

CROSS-REFERENCE TO RELATED APPLICATION

This patent application is a continuation of commonly-owned U.S. patent application Ser. No. 16/134,434 filed on Sep. 18, 2018, entitled "Universal Input-Voltage-Compatible Switched-Mode Power Supply"; and this patent application also claims the benefit of commonly-owned provisional U.S. patent application Ser. No. 62/560,183, filed on Sep. 18, 2017, entitled "Universal Input and Power Factor Corrected LED Controller Circuits". The entireties of each of the foregoing U.S. patent applications having the Ser. Nos. 16/134,434 and 62/560,183 are hereby incorporated herein by reference.

BACKGROUND OF THE INVENTION

Field of the Invention

The present invention relates to the field of switched-mode power supply systems and to the field of lighting systems.

Background of the Invention

Numerous switched-mode power supply systems have been developed for providing power to an output load, such as a light-emitting device. Despite the existence of these switched-mode power supply systems, further improvements are still needed in switched-mode power supply systems for providing power to an output load.

SUMMARY

In an example of an implementation, a switched-mode power supply (SMPS) is provided, including: a direct current (DC)-to-DC step-down converter; a voltage divider; a voltage-to-current converter; and a current mirror. In the example of the SMPS, the direct current DC-to-DC step-down converter has an input terminal, a positive output terminal, a negative output terminal, and a transistor having a channel being coupled between a cathode and an anode, the anode being coupled with a grounded current sense resistor. Also in the example of the SMPS, the DC-to-DC step-down converter is: configured for operation in a boundary conduction mode; and configured for receiving a DC input current [I-a] having an input voltage [V-1] at the input terminal; and configured for causing a DC output current [I-b] having an output voltage [V-2] to flow from the positive output terminal through an output load to the negative output terminal; and configured for being integrated with a controller, the controller being configured for applying a pulse-width-modulated voltage [V-3] to the channel of the transistor for controlling a duty cycle of the DC output current [I-b], the duty cycle having an on-time period (T-On) and an off-time period (T-Off), the controller being coupled with a T-On capacitor having a T-On voltage [V-4], the controller being configured for charging the T-On capacitor during the T-On period by a regulated T-On current [I-c] for setting a maximum limit of the T-On period, the controller being configured for initiating the T-Off period when the T-On capacitor becomes charged to a selected maximum limit of the T-On voltage [V-4]. In the example of the SMPS, the voltage divider is coupled with the input terminal for receiving the input voltage [V-1] and for reducing the input voltage [V-1] to a signal voltage [V-5] being within a selected voltage signal range. In the example of the SMPS, the voltage-to-current converter has a connection with the voltage divider, the voltage-to-current converter including another output terminal being coupled with another transistor having another channel being coupled between another cathode and another anode, the voltage-to-current converter including a grounded precision resistor configured for generating a transconductance voltage [V-6], the voltage-to-current converter being configured for inputting the signal voltage [V-5] and for outputting an error correction voltage [V-7] being applied to the another channel for generating a signal current [I-d] appearing at the another anode and defining a transconductance of the voltage-to-current converter and having a current signal value being within a selected current signal range representing the selected voltage signal range. In the example of the SMPS, the current mirror is coupled with the another cathode and is configured for receiving and combining a regulated supply current [I-e] having a supply voltage [V-8] together with the signal current [I-d] as forming a T-On modulation current [I-f], with the current mirror being configured for causing the T-On modulation current [I-f] to be combined with the regulated T-On current [I-c] to charge the T-On capacitor.

In some examples of the SMPS, the controller may be integrated with the DC-to-DC step-down converter.

In further examples of the SMPS, the controller may include an integrated circuit chip.

In additional examples of the SMPS, the DC-to-DC step-down converter, and the voltage divider, and the voltage-to-current converter, and the current mirror may be included in an integrated circuit.

In other examples of the SMPS, the voltage-to-current converter may include a transconductance amplifier.

In some examples of the SMPS, the transconductance amplifier may include a single-supply operational amplifier having a positive input terminal and a negative input terminal and an amplifier output terminal, the signal voltage [V-5] being coupled with the positive input terminal, the negative input terminal being coupled in a feedback loop with the another anode of the another transistor and being coupled with the grounded precision resistor for defining the transconductance, and the output terminal being configured for applying the error correction voltage [V-7] to the another channel of the another transistor.

In further examples of the SMPS, the precision resistor may be coupled in series with a fixed voltage reference having a fixed voltage [V-9] contributing to the signal current [I-d] appearing at the another anode.

In additional examples of the SMPS, the fixed voltage reference may include a shunt voltage reference circuit.

In other examples of the SMPS, the fixed voltage reference may provide the fixed voltage [V-9] as being within a range having a lower limit of about one (1) volt and having an upper limit of about the supply voltage [V-8] minus one (1) volt, appearing between the precision resistor and the shunt voltage reference circuit.

In some examples of the SMPS, the fixed voltage reference may provide the fixed voltage [V-9] as being within a range of between about one (1) volt and about eleven (11) volts, appearing between the precision resistor and the shunt voltage reference circuit.

In further examples of the SMPS, the fixed voltage reference may provide the fixed voltage [V-9] as being about 1.25 volts, appearing between the precision resistor and the shunt voltage reference circuit.

In additional examples of the SMPS, the supply voltage [V-8] of the regulated supply current [I-e] may be within a range of between about eight (8) volts and about fourteen (14) volts.

In other examples of the SMPS, the input voltage [V-1] may have a root-mean-square (rms) value of the input voltage [V-1] as being within a range of between about 100 volts and about 277 volts.

In some examples of the SMPS, the controller may be configured for regulating the output voltage [V-2] independently of the input voltage [V-1].

In further examples of the SMPS, the voltage divider may include a first resistor having a connection in series with a second resistor, with the input voltage [V-1] being applied across the resistors and the signal voltage [V-5] appearing at the connection between them.

In additional examples of the SMPS, the voltage divider may further include a capacitor in parallel with the second resistor, for filtering high frequency noise.

In other examples of the SMPS, the selected voltage signal may have a voltage range being between about one (1) volt and about five (5) volts.

In some examples of the SMPS, the selected voltage signal may have a voltage range being between about 0.3 volt and about 1.2 volts.

In further examples of the SMPS, the selected voltage signal may have a voltage range being between about one (1) volt and about five (5) volts; and the current signal of the signal current [I-d] may have a magnitude being within a representative selected range of between about one hundred micro-amps (100 μA) and about five hundred micro-amps (500 μA).

In additional examples of the SMPS, the selected maximum limit of the T-On voltage [V-4] may be within a range of between about zero (0) volts and about ten (10) volts.

In other examples of the SMPS, the selected maximum limit of the T-On voltage [V-4] may be within a range of between about one (1) volt and about four (4) volts.

In some examples of the SMPS, the selected maximum limit of the T-On voltage [V-4] may be about 4 volts.

In further examples of the SMPS, the DC-to-DC step-down converter may include an inductor having a first end and a second end; and the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In additional examples of the SMPS, the DC-to-DC step-down converter may be configured for charging the inductor and charging the output capacitor during the T-On period; and the DC-to-DC step-down converter may be configured for discharging the inductor and discharging the output capacitor during the T-Off period.

In other examples of the SMPS, the controller may be configured for initiating the T-On period when the inductor is discharged.

In some examples of the SMPS, the DC-to-DC step-down converter may include a transformer, and the inductor may be a primary winding of the transformer, and the transformer may include a secondary winding.

In further examples of the SMPS, the DC-to-DC step-down converter may include a buck converter circuit, or a step-down buck-boost converter circuit, or a Sepic converter circuit, or a auk converter circuit.

In additional examples of the SMPS, the controller may be configured for applying the pulse-width-modulated voltage [V-3] as being in phase with the input voltage [V-1].

In some examples of the SMPS, the controller may be configured for applying the pulse-width-modulated voltage [V-3] in a peak current mode.

In other examples, the SMPS may further include a rectifying circuit having a diode bridge and being coupled with the input terminal, and the rectifying circuit may be configured for rectifying a mains alternating current (AC) input voltage.

In some examples of the SMPS, the rectifying circuit may include a full-wave rectifier.

In further examples of the SMPS, the output load may include a semiconductor light-emitting device.

In additional examples of the SMPS, the transistor may be a field effect transistor having a gate, and the channel may be coupled between the anode and the cathode as respectively being a source and a drain.

In other examples of the SMPS, the field effect transistor may be an insulated gate field effect transistor.

In further examples of the SMPS, the insulated gate field effect transistor may be a metal oxide semiconductor field effect transistor (MOSFET).

In additional examples of the SNIPS, the MOSFET may be an enhancement-mode n-channel MOSFET.

In some examples of the SMPS, the another transistor may be a bipolar junction transistor having a base; and the another channel may be coupled between the another anode and the another cathode as respectively being an emitter and a collector; and the another output terminal may be coupled with the base of the another transistor.

In further examples of the SMPS, the bipolar junction transistor may be an n-channel transistor.

In additional examples of the SMPS, the current mirror may include a third transistor having a third channel being coupled between a third cathode and a third anode, and the current mirror may include a fourth transistor having a fourth channel being coupled between a fourth cathode and a fourth anode.

In other examples of the SMPS, the current mirror may be a Wilson current mirror including a fifth transistor having a fifth channel being coupled between a fifth cathode and a fifth anode, and the another cathode may be coupled with the third cathode, and the fifth cathode may be coupled with the T-On capacitor.

In some examples of the SMPS, each of the third, fourth and fifth transistors may be a bipolar junction transistor.

In additional examples of the SMPS, each of the third, fourth and fifth bipolar junction transistors may be a p-channel transistor.

In another example of an implementation, a switched-mode power supply (SMPS) is provided, including: a direct current (DC)-to-DC step-down converter; a voltage divider; a voltage-to-current converter; and a current mirror. In the another example of the SMPS, the direct current DC-to-DC step-down converter has an input terminal, a positive output terminal, and a negative output terminal. Also in the another example of the SNIPS, the DC-to-DC step-down converter is: configured for operation in a boundary conduction mode; and configured for receiving a DC input current [I-a] having an input voltage [V-1] at the input terminal; and configured for causing a DC output current [I-b] having an output voltage [V-2] to flow from the positive output terminal through an output load to the negative output terminal; and configured for being integrated with a controller including a transistor having a channel being coupled between a cathode and an anode, the anode being coupled with a grounded current sense resistor, the controller being configured for applying a pulse-width-modulated voltage [V-3] to the channel of the transistor for controlling a duty cycle of the DC output current [I-b], the duty cycle having an on-time period (T-On) and an off-time period (T-Off), the controller being coupled with a T-On capacitor having a T-On voltage [V-4], the controller being configured for charging the T-On capacitor during the T-On period by a regulated T-On current [I-c] for setting a maximum limit of the T-On period, the controller being configured for initiating the T-Off period when the T-On capacitor becomes charged to a selected maximum limit of the T-On voltage [V-4]. In the another example of the SMPS, the voltage divider is coupled with the input terminal for receiving the input voltage [V-1] and for reducing the input voltage [V-1] to a signal voltage [V-5] being within a selected voltage signal range. In the another example of the SMPS, the voltage-to-current converter has a connection with the voltage divider, the voltage-to-current converter including another output terminal being coupled with another transistor having another channel being coupled between another cathode and another anode, the voltage-to-current converter including a grounded precision resistor configured for generating a transconductance voltage [V-6], the voltage-to-current converter being configured for inputting the signal voltage [V-5] and for outputting an error correction voltage [V-7] being applied to the another channel for generating a signal current [I-d] appearing at the another anode and defining a transconductance of the voltage-to-current converter and having a current signal value being within a selected current signal range representing the selected voltage signal range. In the another example of the SMPS, the current mirror is coupled with the another cathode and is configured for receiving and combining a regulated supply current [I-e] having a supply voltage [V-8] together with the signal current [I-d] as forming a T-On modulation current [I-f], with the current mirror being configured for causing the T-On modulation current [I-f] to be combined with the regulated T-On current [I-c] to charge the T-On capacitor.

In some examples of the SMPS, the controller may be integrated with the DC-to-DC step-down converter.

In further examples of the SMPS, the controller may include an integrated circuit chip.

In additional examples of the SMPS, the DC-to-DC step-down converter, and the voltage divider, and the voltage-to-current converter, and the current mirror may be included in an integrated circuit.

In other examples of the SMPS, the voltage-to-current converter may include a transconductance amplifier.

In some examples of the SMPS, the transconductance amplifier may include a single-supply operational amplifier having a positive input terminal and a negative input terminal and an amplifier output terminal, the signal voltage [V-5] being coupled with the positive input terminal, the negative input terminal being coupled in a feedback loop with the another anode of the another transistor and being coupled with the grounded precision resistor for defining the transconductance, and the output terminal being configured for applying the error correction voltage [V-7] to the another channel of the another transistor.

In further examples of the SMPS, the precision resistor may be coupled in series with a fixed voltage reference having a fixed voltage [V-9] contributing to the signal current [I-d] appearing at the another anode.

In additional examples of the SMPS, the fixed voltage reference may include a shunt voltage reference circuit.

In other examples of the SMPS, the fixed voltage reference may provide the fixed voltage [V-9] as being within a range having a lower limit of about one (1) volt and having an upper limit of about the supply voltage [V-8] minus one (1) volt, appearing between the precision resistor and the shunt voltage reference circuit.

In some examples of the SMPS, the fixed voltage reference may provide the fixed voltage [V-9] as being within a range of between about one (1) volt and about eleven (11) volts, appearing between the precision resistor and the shunt voltage reference circuit.

In further examples of the SMPS, the fixed voltage reference may provide the fixed voltage [V-9] as being about 1.25 volts, appearing between the precision resistor and the shunt voltage reference circuit.

In additional examples of the SMPS, the supply voltage [V-8] of the regulated supply current [I-e] may be within a range of between about eight (8) volts and about fourteen (14) volts.

In other examples of the SMPS, the input voltage [V-1] may have a root-mean-square (rms) value of the input voltage [V-1] as being within a range of between about 100 volts and about 277 volts.

In some examples of the SMPS, the controller may be configured for regulating the output voltage [V-2] independently of the input voltage [V-1].

In further examples of the SMPS, the voltage divider may include a first resistor having a connection in series with a second resistor, with the input voltage [V-1] being applied across the resistors and the signal voltage [V-5] appearing at the connection between them.

In additional examples of the SMPS, the voltage divider may further include a capacitor in parallel with the second resistor, for filtering high frequency noise.

In other examples of the SMPS, the selected voltage signal may have a voltage range being between about one (1) volt and about five (5) volts.

In some examples of the SMPS, the selected voltage signal may have a voltage range being between about 0.3 volt and about 1.2 volts.

In further examples of the SMPS, the selected voltage signal may have a voltage range being between about one (1) volt and about five (5) volts; and the current signal of the signal current [I-d] may have a magnitude being within a representative selected range of between about one hundred micro-amps (100 μA) and about five hundred micro-amps (500 μA).

In additional examples of the SMPS, the selected maximum limit of the T-On voltage [V-4] may be within a range of between about zero (0) volts and about ten (10) volts.

In other examples of the SMPS, the selected maximum limit of the T-On voltage [V-4] may be within a range of between about one (1) volt and about four (4) volts.

In some examples of the SMPS, the selected maximum limit of the T-On voltage [V-4] may be about 4 volts.

In further examples of the SMPS, the DC-to-DC step-down converter may include an inductor having a first end and a second end; and the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In additional examples of the SMPS, the DC-to-DC step-down converter may be configured for charging the inductor and charging the output capacitor during the T-On period; and the DC-to-DC step-down converter may be configured for discharging the inductor and discharging the output capacitor during the T-Off period.

In other examples of the SMPS, the controller may be configured for initiating the T-On period when the inductor is discharged.

In some examples of the SMPS, the DC-to-DC step-down converter may include a transformer, and the inductor may be a primary winding of the transformer, and the transformer may include a secondary winding.

In further examples of the SMPS, the DC-to-DC step-down converter may include a buck converter circuit, or a step-down buck-boost converter circuit, or a Sepic converter circuit, or a ćuk converter circuit.

In additional examples of the SMPS, the controller may be configured for applying the pulse-width-modulated voltage [V-3] as being in phase with the input voltage [V-1].

In some examples of the SMPS, the controller may be configured for applying the pulse-width-modulated voltage [V-3] in a peak current mode.

In other examples, the SMPS may further include a rectifying circuit having a diode bridge and being coupled with the input terminal, and the rectifying circuit may be configured for rectifying a mains alternating current (AC) input voltage.

In some examples of the SMPS, the rectifying circuit may include a full-wave rectifier.

In further examples of the SMPS, the output load may include a semiconductor light-emitting device.

In additional examples of the SMPS, the transistor may be a field effect transistor having a gate, and the channel may be coupled between the anode and the cathode as respectively being a source and a drain.

In other examples of the SMPS, the field effect transistor may be an insulated gate field effect transistor.

In further examples of the SMPS, the insulated gate field effect transistor may be a metal oxide semiconductor field effect transistor (MOSFET).

In additional examples of the SMPS, the MOSFET may be an enhancement-mode n-channel MOSFET.

In some examples of the SMPS, the another transistor may be a bipolar junction transistor having a base; and the another channel may be coupled between the another anode and the another cathode as respectively being an emitter and a collector; and the another output terminal may be coupled with the base of the another transistor.

In further examples of the SMPS, the bipolar junction transistor may be an n-channel transistor.

In additional examples of the SMPS, the current mirror may include a third transistor having a third channel being coupled between a third cathode and a third anode, and the current mirror may include a fourth transistor having a fourth channel being coupled between a fourth cathode and a fourth anode.

In other examples of the SMPS, the current mirror may be a Wilson current mirror including a fifth transistor having a fifth channel being coupled between a fifth cathode and a fifth anode, and the another cathode may be coupled with the third cathode, and the fifth cathode may be coupled with the T-On capacitor.

In some examples of the SMPS, each of the third, fourth and fifth transistors may be a bipolar junction transistor.

In additional examples of the SMPS, each of the third, fourth and fifth bipolar junction transistors may be a p-channel transistor.

In a further example of an implementation, a switched-mode power supply (SMPS) integrated circuit is provided, including: a direct current (DC)-to-DC step-down converter; a switch; and an element being configured for storage of potential energy in an electric field and having a T-On voltage [V-4]. In the example of the SMPS integrated circuit, the SMPS is configured to receive a DC input current [I-a] having an input voltage [V-1] and to output, through an output load, a DC output current [I-b] having an output voltage [V-2]. Also in the example of the SMPS integrated circuit, the SMPS is configured to operate in a boundary conduction mode by applying a pulse-width-modulated voltage [V-3] to the switch for controlling a duty cycle of the DC output current [I-b], the duty cycle having an on-time period (T-On) and an off-time period (T-Off). The SMPS in the example of the SMPS integrated circuit is configured to generate a regulated T-On current [I-c] for setting a maximum limit of the on-time period (T-On) of the duty cycle. In the example of the SMPS integrated circuit, the SMPS is configured to monitor the input voltage [V-1] by reducing the input voltage [V-1] to a signal voltage [V-5] being within a selected voltage signal range. The SMPS in the example of the SMPS integrated circuit is configured to convert the signal voltage [V-5] to a signal current [I-d] having a current signal value being within a selected current signal range representing the selected voltage signal range. In the example of the SMPS integrated circuit, the SMPS also is configured to output a T-On modulation current [I-f] including the signal current [I-d]. The SMPS in the example of the SMPS integrated circuit is configured to combine together the T-On modulation current [I-f] with the regulated T-On current [I-c] during the T-On period to store potential energy in the element, while causing the SMPS to monitor the T-On voltage [V-4] of the element. Further In the example of the SMPS integrated circuit, the SMPS is configured to initiate the T-Off period when the potential energy stored in the element reaches a selected maximum limit of the T-On voltage [V-4].

In some examples of the SMPS integrated circuit, the element configured for storage of potential energy in the electric field may include a T-On capacitor.

In further examples, the SMPS integrated circuit may be in the form of a microcontroller, an application-specific integrated circuit (ASIC), a digital signal processor (DSP), or a field-programmable gate array (FPGA).

In additional examples, the SMPS integrated circuit may further include a voltage-to-current converter being configured to receive the signal voltage [V-5] and to output an error correction voltage [V-7] for generating the signal current [I-d] as defining a transconductance of the voltage-to-current converter.

In other examples of the SMPS integrated circuit, the voltage-to-current converter may include a transconductance amplifier.

In some examples of the SMPS integrated circuit, the transconductance amplifier may include a single-supply operational amplifier having a positive input terminal and a negative input terminal and an amplifier output terminal, the signal voltage [V-5] being coupled with the positive input terminal, the negative input terminal being coupled in a feedback loop with another anode of another transistor and being coupled with a grounded precision resistor for generating a transconductance voltage [V-6], and the output terminal being configured for applying the error correction voltage [V-7] to another channel of the another transistor.

In further examples of the SMPS integrated circuit, the precision resistor of the transconductance amplifier may be coupled in series with a fixed voltage reference having a fixed voltage [V-9] contributing to the signal current [I-d] appearing at the another anode.

In additional examples of the SMPS integrated circuit, the fixed voltage reference may include a shunt voltage reference circuit.

In other examples of the SMPS integrated circuit, the transconductance amplifier may be configured for providing the fixed voltage [V-9] as being within a range having a lower limit of about one (1) volt and having an upper limit of about the supply voltage [V-8] minus one (1) volt, appearing between the precision resistor and the shunt voltage reference circuit.

In some examples of the SMPS integrated circuit, the transconductance amplifier may be configured for providing the fixed voltage [V-9] as being within a range of between about one (1) volt and about eleven (11) volts, appearing between the precision resistor and the shunt voltage reference circuit.

In further examples of the SMPS integrated circuit, the transconductance amplifier may be configured for providing the fixed voltage [V-9] as being about 1.25 volts, appearing between the precision resistor and the shunt voltage reference circuit.

In additional examples, the SMPS integrated circuit may be configured for combining a regulated supply current [I-e] having a supply voltage [V-8] together with the signal current [I-d] as forming the T-On modulation current [I-f].

In other examples, the SMPS integrated circuit may be configured to regulate the supply voltage [V-8] of the regulated supply current [I-e] as being within a range of between about eight (8) volts and about fourteen (14) volts.

In some examples, the SMPS integrated circuit may further include a current mirror, and the current mirror may be configured to receive and combine the regulated supply current [I-e] together with the signal current [I-d] as forming the T-On modulation current [I-f].

In further examples of the SMPS integrated circuit, the current mirror may be configured to receive and combine the T-On modulation current [I-f] together with the regulated T-On current [I-c].

In some examples, the SMPS integrated circuit may include a voltage divider for monitoring the input voltage [V-1] by reducing the input voltage [V-1] to the signal voltage [V-5]; and the voltage divider may include, for example, a first resistor having a connection in series with a second resistor, with the input voltage [V-1] being applied across the resistors and the signal voltage [V-5] appearing at the connection between them.

In additional examples, the SMPS integrated circuit may be configured to receive the DC input current [I-a] with the input voltage [V-1] as having a root-mean-square (rms) value of the input voltage [V-1] being within a range of between about 100 volts and about 277 volts.

In other examples of the SMPS integrated circuit, the SMPS integrated circuit may be configured for regulating the output voltage [V-2] independently of the input voltage [V-1].

In some examples, the SMPS integrated circuit may be configured for reducing the input voltage [V-1] to the selected voltage signal range as being between about one (1) volt and about five (5) volts.

In further examples, the SMPS integrated circuit may be configured for reducing the input voltage [V-1] to the selected voltage signal range as being between about 0.3 volt and about 1.2 volts.

In additional examples, the SMPS integrated circuit may be configured for reducing the input voltage [V-1] to a signal voltage [V-5] being within a selected voltage signal range of between about one (1) volt and about five (5) volts; and the SMPS integrated circuit may be configured for converting the signal voltage [V-5] to a signal current [I-d] having a magnitude being within a selected representative current signal range of between about one hundred micro-amps (100 µA) and about five hundred micro-amps (500 µA).

In other examples, the SMPS integrated circuit may be configured to initiate the T-Off period when the potential energy stored in the element reaches a selected maximum limit of the T-On voltage [V-4] as being within a range of between about zero (0) volts and about ten (10) volts.

In some examples, the SMPS integrated circuit may be configured to initiate the T-Off period when the potential energy stored in the element reaches a selected maximum limit of the T-On voltage [V-4] as being within a range of between about one (1) volt and about four (4) volts.

In further examples, the SMPS integrated circuit may be configured to initiate the T-Off period when the potential energy stored in the element reaches a selected maximum limit of the T-On voltage [V-4] as being about four (4) volts.

In additional examples of the SMPS integrated circuit, the DC-to-DC step-down converter may include an inductor having a first end and a second end; and the switch may include a transistor having a channel being coupled between a cathode and an anode, the anode being coupled with a grounded current sense resistor; and the SMPS integrated circuit may be configured for receiving the DC input current [I-a] at an input terminal, and for causing the DC output current [I-b] to flow from the positive output terminal through an output load to a negative output terminal; and the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In other examples, the SMPS integrated circuit may be configured for causing the DC-to-DC step-down converter to: charge the inductor and charge the output capacitor during the T-On period; and to discharge the inductor and discharge the output capacitor during the T-Off period.

In some examples, the SMPS integrated circuit may be configured for initiating the T-On period when the inductor is discharged.

In further examples of the SMPS integrated circuit, the DC-to-DC step-down converter may include a buck converter circuit, or a step-down buck-boost converter circuit, or a Sepic converter circuit, or a auk converter circuit.

In additional examples, the SMPS integrated circuit may be configured for applying the pulse-width-modulated voltage [V-3] as being in phase with the input voltage [V-1].

In some examples, the SMPS integrated circuit may be configured for applying the pulse-width-modulated voltage [V-3] in a peak current mode.

In other examples, the SMPS integrated circuit may further include a rectifying circuit being configured for rectifying a mains alternating current (AC) input voltage.

In some examples of the SMPS integrated circuit, the rectifying circuit may include a full-wave rectifier.

In further examples, the SMPS integrated circuit may be configured for output of the DC output current [I-b] through an output load including a semiconductor light-emitting device.

In an additional example of an implementation, a method of operating a switched-mode power supply (SMPS) is provided, that includes providing an SMPS having: a direct current (DC)-to-DC step-down converter; a switch; and an element being configured for storage of potential energy in an electric field and having a T-On voltage [V-4]. The example of the method of operating an SMPS includes causing the SMPS to receive a DC input current [I-a] having an input voltage [V-1] and to output, through an output load, a DC output current [I-b] having an output voltage [V-2]. The example of the method of operating an SMPS also includes causing the SMPS to operate in a boundary conduction mode by applying a pulse-width-modulated voltage [V-3] to the switch for controlling a duty cycle of the DC output current [I-b], the duty cycle having an on-time period (T-On) and an off-time period (T-Off). Further, the example of the method of operating an SMPS includes causing the SMPS to generate a regulated T-On current [I-c] for setting a maximum limit of the on-time period (T-On) of the duty cycle. The example of the method of operating an SMPS additionally includes causing the SMPS to monitor the input voltage [V-1] by reducing the input voltage [V-1] to a signal voltage [V-5] being within a selected voltage signal range. In the example of the method of operating an SMPS, the SMPS is caused to convert the signal voltage [V-5] to a signal current [I-d] having a current signal value being within a selected current signal range representing the selected voltage signal range. Additionally, the example of the method of operating an SMPS includes causing the SMPS to output a T-On modulation current [I-f] including the signal current [I-d]. The example of the method of operating an SMPS further includes causing the SMPS to combine together the T-On modulation current [I-f] with the regulated T-On current [I-c] during the T-On period to store potential energy in the element, while causing the SMPS to monitor the T-On voltage [V-4] of the element. In the example of the method of operating an SMPS, the SMPS is also caused to initiate the T-Off period when the potential energy stored in the element reaches a selected maximum limit of the T-On voltage [V-4].

In some examples of the method of operating an SMPS, the providing may include providing a T-On capacitor as being the element configured for storage of potential energy in the electric field.

In further examples of the method of operating an SMPS, the providing may include providing a voltage-to-current converter, and the causing the SMPS to convert the signal voltage [V-5] to a signal current [I-d] may include causing the voltage-to-current converter to output an error correction voltage [V-7] for generating the signal current [I-d] as defining a transconductance of the voltage-to-current converter.

In additional examples of the method of operating an SMPS, the providing a voltage-to-current converter may include providing a transconductance amplifier.

In other examples of the method of operating an SMPS, providing the transconductance amplifier may include providing the transconductance amplifier as including a single-supply operational amplifier having a positive input terminal and a negative input terminal and an amplifier output terminal, the signal voltage [V-5] being coupled with the positive input terminal, the negative input terminal being coupled in a feedback loop with another anode of another transistor and being coupled with a grounded precision resistor for generating a transconductance voltage [V-6], and the output terminal being configured for applying the error correction voltage [V-7] to another channel of the another transistor.

In some examples of the method of operating an SMPS, providing the transconductance amplifier may include providing the precision resistor as being coupled in series with a fixed voltage reference having a fixed voltage [V-9] contributing to the signal current [I-d] appearing at the another anode.

In further examples of the method of operating an SMPS, providing the transconductance amplifier may include providing the fixed voltage reference as including a shunt voltage reference circuit.

In additional examples of the method of operating an SMPS, providing the transconductance amplifier may include selecting the fixed voltage reference as providing the fixed voltage [V-9] as being within a range having a lower limit of about one (1) volt and having an upper limit of about the supply voltage [V-8] minus one (1) volt, appearing between the precision resistor and the shunt voltage reference circuit.

In other examples of the method of operating an SMPS, providing the transconductance amplifier may include selecting the fixed voltage [V-9] as being within a range of between about one (1) volt and about eleven (11) volts, appearing between the precision resistor and the shunt voltage reference circuit.

In some examples of the method of operating an SMPS, providing the transconductance amplifier may include selecting the fixed voltage reference as providing the fixed voltage [V-9] being about 1.25 volts, appearing between the precision resistor and the shunt voltage reference circuit.

In further examples of the method of operating an SMPS, causing the SMPS to output the T-On modulation current [I-f] may include combining a regulated supply current [I-e] having a supply voltage [V-8] together with the signal current [I-d] as forming the T-On modulation current [I-f].

In additional examples of the method of operating an SMPS, causing the SMPS to output the T-On modulation current [I-f] may include selecting the supply voltage [V-8] of the regulated supply current [I-e] as being within a range of between about eight (8) volts and about fourteen (14) volts.

In other examples of the method of operating, providing the SMPS may include providing a current mirror, and causing the SMPS to output the T-On modulation current [I-f] may include causing the current mirror to receive and combine the regulated supply current [I-e] together with the signal current [I-d] as forming the T-On modulation current [I-f].

In some examples of the method of operating, causing the SMPS to combine together the T-On modulation current [I-f] with the regulated T-On current [I-c] may include causing the current mirror to receive and combine the T-On modulation current [I-f] together with the regulated T-On current [I-c].

In further examples of the method of operating, causing the SMPS to receive the DC input current [I-a] may include selecting the input voltage [V-1] as having a root-mean-square (rms) value of the input voltage [V-1] being within a range of between about 100 volts and about 277 volts.

In some examples of the method of operating, causing the SMPS to monitor the input voltage [V-1] by reducing the input voltage [V-1] to a signal voltage [V-5] may include providing a voltage divider; and providing the voltage divider may include providing the voltage divider as having, for example, a first resistor having a connection in series with a second resistor, with the input voltage [V-1] being applied across the resistors and the signal voltage [V-5] appearing at the connection between them.

In additional examples of the method of operating, causing the SMPS to output the DC output current [I-b] may include regulating the output voltage [V-2] independently of the input voltage [V-1].

In other examples of the method of operating, causing the SMPS to monitor the input voltage [V-1] may include reducing the input voltage [V-1] to the selected voltage signal range as being between about one (1) volt and about five (5) volts.

In some examples of the method of operating, causing the SMPS to monitor the input voltage [V-1] may include reducing the input voltage [V-1] to the selected voltage signal range as being between about 0.3 volt and about 1.2 volts.

In further examples of the method of operating an SMPS, reducing the input voltage [V-1] to a signal voltage [V-5] may include selecting the voltage signal range as being between about one (1) volt and about five (5) volts; and converting the signal voltage [V-5] to a signal current [I-d] may include selecting the current signal range as having a magnitude being within a representative selected range of between about one hundred micro-amps (100 µA) and about five hundred micro-amps (500 µA).

In additional examples of the method of operating an SMPS, causing the SMPS to initiate the T-Off period when the potential energy stored in the element reaches a selected maximum limit of the T-On voltage [V-4] may include selecting the maximum limit of the T-On voltage [V-4] as being within a range of between about zero (0) volts and about ten (10) volts.

In other examples of the method of operating an SMPS, causing the SMPS to initiate the T-Off period when the potential energy stored in the element reaches a selected maximum limit of the T-On voltage [V-4] may include selecting the maximum limit of the T-On voltage [V-4] as being within a range of between about one (1) volt and about four (4) volts.

In some examples of the method of operating an SMPS, causing the SMPS to initiate the T-Off period when the potential energy stored in the element reaches a selected maximum limit of the T-On voltage [V-4] may include selecting the maximum limit of the T-On voltage [V-4] as being about (4) volts.

In further examples of the method of operating an SMPS, providing the DC-to-DC step-down converter may include providing an inductor having a first end and a second end; and providing the switch may include providing a transistor having a channel being coupled between a cathode and an anode, the anode being coupled with a grounded current sense resistor. Also in those further examples, causing the SMPS to receive the DC input current [I-a] may include providing an input terminal; and causing the SMPS to output the DC output current [I-b] may include providing a positive output terminal and a negative output terminal, and causing the DC output current [I-b] to flow from the positive output terminal through the output load to the negative output terminal. Additionally in those examples, the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In additional examples of the method of operating an SMPS, causing the SMPS to operate in the boundary conduction mode may include causing the DC-to-DC step-down converter to: charge the inductor and charge the output capacitor during the T-On period; and to discharge the inductor and discharge the output capacitor during the T-Off period.

In other examples of the method of operating an SMPS, causing the SMPS to operate in the boundary conduction mode may include causing the SMPS to initiate the T-On period when the inductor is discharged.

In some examples of the method of operating an SMPS, providing the DC-to-DC step-down converter may include providing the DC-to-DC step-down converter as including a buck converter circuit, or a step-down buck-boost converter circuit, or a Sepic converter circuit, or a ƈuk converter circuit.

In further examples of the method of operating an SMPS, causing the SMPS to operate in the boundary conduction mode may include applying the pulse-width-modulated voltage [V-3] as being in phase with the input voltage [V-1].

In additional examples of the method of operating an SMPS, causing the SMPS to operate in the boundary conduction mode may include causing the SMPS to apply the pulse-width-modulated voltage [V-3] in a peak current mode.

In additional examples of the method of operating an SMPS, providing the SMPS may include providing a rectifying circuit, and causing the SMPS to receive the DC input current may include rectifying a mains alternating current (AC) input voltage.

In other examples of the method of operating an SMPS, providing the SMPS may include providing the rectifying circuit as including a full-wave rectifier.

In some examples of the method of operating an SMPS, causing the SMPS to output a DC output current [I-b] through an output load may include selecting the output load as including a semiconductor light-emitting device.

In yet another example of an implementation, an integrated circuit is provided as being configured for implementing the method of operating an SMPS, the integrated circuit being in the form of a microcontroller, an application-specific integrated circuit (ASIC), a digital signal processor (DSP), or a field-programmable gate array (FPGA).

In an additional example of an implementation, another switched-mode power supply (SMPS) integrated circuit is provided, including: a direct current (DC)-to-DC step-down converter; a switch; and an element being configured for storage of potential energy in an electric field and having a T-On voltage [V-4]. In the example of the SMPS integrated circuit, the SMPS is configured to receive a DC input current [I-a] having an input voltage [V-1] and to output, through an output load, a DC output current [I-b] having an output voltage [V-2]. Also in the example of the SMPS integrated circuit, the SMPS is configured to operate in a boundary conduction mode by applying a pulse-width-modulated voltage [V-3] to the switch for controlling a duty cycle of the DC output current [I-b], the duty cycle having an on-time period (T-On) and an off-time period (T-Off). Further in this example, the SMPS integrated circuit is configured for setting a maximum T-On voltage [V-4] of the element. In this example, the SMPS integrated circuit is configured to monitor the input voltage [V-1] by reducing the input voltage [V-1] to a signal voltage [V-5] being within a selected voltage signal range. Also in this example, the SMPS integrated circuit is configured to convert the signal voltage [V-5] to a signal current [I-d] having a current signal value being within a selected current signal range representing the selected voltage signal range. The SMPS integrated circuit in this example is configured to generate a T-On current [I-c] having an amperage taking into account the current signal value to set the on-time period (T-On) of the duty cycle. Further in this example, the SMPS integrated circuit is configured for causing the T-On current [I-c] to store potential energy in the element during the T-On period, while causing the SMPS integrated circuit to monitor the T-On voltage [V-4] of the element. Additionally in this example, the SMPS integrated circuit is configured to initiate the T-Off period when the potential energy stored in the element reaches the maximum T-On voltage [V-4].

In some examples of this SMPS integrated circuit, the element configured for storage of potential energy in the electric field may include a T-On capacitor.

In further examples of this SMPS integrated circuit, the integrated circuit may be in the form of a microcontroller, an application-specific integrated circuit (ASIC), a digital signal processor (DSP), or a field-programmable gate array (FPGA).

In additional examples, this SMPS integrated circuit may further include a voltage-to-current converter being configured to receive the signal voltage and to output an error correction voltage for generating the signal current as defining a transconductance of the voltage-to-current converter.

In other examples, this SMPS integrated circuit may be configured to receive the DC input current with the input voltage as having a root-mean-square (rms) value of the input voltage being within a range of between about 100 volts and about 277 volts.

In some examples, this SMPS integrated circuit may be configured for regulating the output voltage independently of the input voltage.

In further examples of this SMPS integrated circuit, the DC-to-DC step-down converter may include an inductor having a first end and a second end; and the switch may include a transistor having a channel being coupled between a cathode and an anode, the anode being coupled with a grounded current sense resistor; and the SMPS integrated circuit may be configured for receiving the DC input current at an input terminal, and for causing the DC output current to flow from the positive output terminal through an output load to a negative output terminal; and the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In other examples of this SMPS integrated circuit, the DC-to-DC step-down converter may include a buck converter circuit, or a step-down buck-boost converter circuit, or a Sepic converter circuit, or a auk converter circuit.

In some examples, this SMPS integrated circuit may be configured for applying the pulse-width-modulated voltage as being in phase with the input voltage.

In another example of an implementation, a further switched-mode power supply (SMPS) integrated circuit is provided, including: a direct current (DC)-to-DC step-down converter; a switch; and an element being configured for storage of potential energy in an electric field and having a T-On voltage [V-4]. In the example of the SMPS integrated circuit, the SMPS is configured to receive a DC input current [I-a] having an input voltage [V-1] and to output, through an output load, a DC output current [I-b] having an output voltage [V-2]. Also in the example of the SMPS integrated circuit, the SMPS is configured to operate in a boundary conduction mode by applying a pulse-width-modulated voltage [V-3] to the switch for controlling a duty cycle of the DC output current [I-b], the duty cycle having an on-time period (T-On) and an off-time period (T-Off). Further in this example, the SMPS integrated circuit is configured for causing a T-On current [I-c] to store potential energy in the element during the T-On period while monitoring a T-On voltage [V-4] of the element. Also in this example, the SMPS integrated circuit is configured to monitor the input voltage [V-1] by reducing the input voltage [V-1] to a signal voltage [V-5] being within a selected voltage signal range. Additionally in this example, the SMPS integrated circuit is configured to set a maximum T-On voltage [V-4] taking into account the signal voltage [V-5]. Additionally in this example, the SMPS integrated circuit is configured to initiate the T-Off period when the potential energy stored in the element reaches the maximum T-On voltage [V-4].

In some examples of this SMPS integrated circuit, the element configured for storage of potential energy in the electric field may include a T-On capacitor.

In further examples of this SMPS integrated circuit, the integrated circuit may be in the form of a microcontroller, an application-specific integrated circuit (ASIC), a digital signal processor (DSP), or a field-programmable gate array (FPGA).

In additional examples, this SMPS integrated circuit may further include a voltage-to-current converter being configured to receive the signal voltage and to output an error correction voltage for generating the signal current as defining a transconductance of the voltage-to-current converter.

In other examples, this SMPS integrated circuit may be configured to receive the DC input current with the input voltage as having a root-mean-square (rms) value of the input voltage being within a range of between about 100 volts and about 277 volts.

In some examples, this SMPS integrated circuit may be configured for regulating the output voltage independently of the input voltage.

In further examples of this SMPS integrated circuit, the DC-to-DC step-down converter may include an inductor having a first end and a second end; and the switch may include a transistor having a channel being coupled between a cathode and an anode, the anode being coupled with a grounded current sense resistor; and the SMPS integrated circuit may be configured for receiving the DC input current at an input terminal, and for causing the DC output current to flow from the positive output terminal through an output load to a negative output terminal; and the first end of the inductor may be coupled with the negative output terminal; and the second end of the inductor may be coupled at another node with the cathode of the transistor; and the DC-to-DC step-down converter may include a freewheel diode being coupled between the input terminal and the another node and being coupled with the cathode of the transistor; and the DC-to-DC step-down converter may include an output capacitor being coupled between the positive output terminal and the negative output terminal.

In other examples of this SMPS integrated circuit, the DC-to-DC step-down converter may include a buck converter circuit, or a step-down buck-boost converter circuit, or a Sepic converter circuit, or a ĉuk converter circuit.

In some examples, this SMPS integrated circuit may be configured for applying the pulse-width-modulated voltage as being in phase with the input voltage.

Other systems, devices, processes, features and advantages of the invention will be or will become apparent to one with skill in the art upon examination of the following figures and detailed description. It is intended that all such additional systems, devices, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
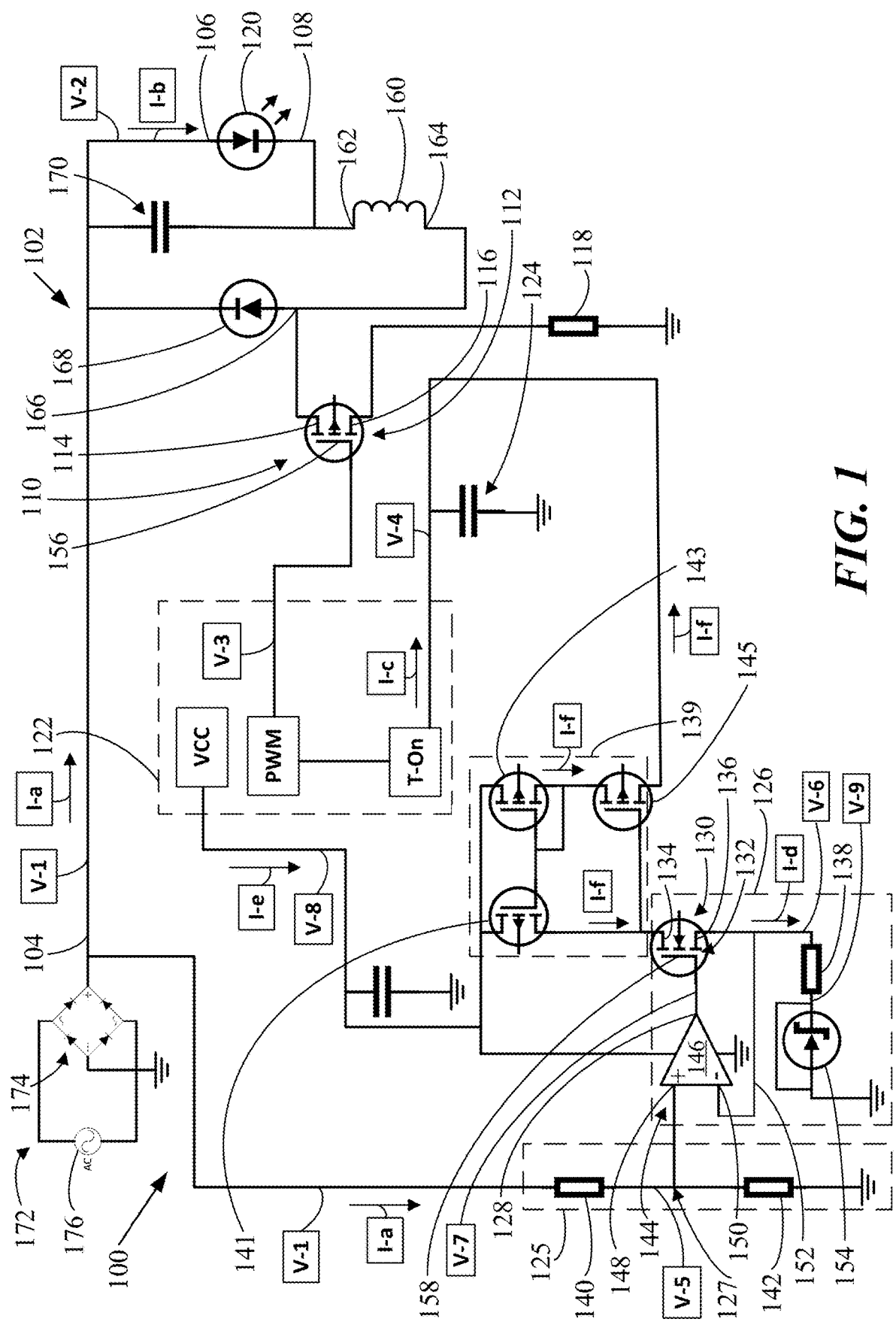
FIG. 1 is a schematic diagram showing examples [100] of an implementation of a switched-mode power supply (SMPS).

Various switched-mode power supplies (SMPS) have been developed for delivering a DC output current to an output load, that operate by applying a pulse-width-modulated voltage to a switch for controlling a duty cycle of the DC output current having an on-time period (T-On) and an off-time period (T-Off). Despite these efforts, such switched-mode power supplies often have demonstrably failed to be universally compatible with commonly-available mains alternating current (AC) input voltages and corresponding commonly-available rectified DC input voltages.

Accordingly, in an example, a switched-mode power supply (SMPS) is provided, including: a direct current (DC)-to-DC step-down converter; a voltage divider; a voltage-to-current converter; and a current mirror. In the example of the SMPS, the direct current DC-to-DC step-down converter has an input terminal, a positive output terminal, a negative output terminal, and a transistor having a channel being coupled between a cathode and an anode, the anode being coupled with a grounded current sense resistor. Also in the example of the SMPS, the DC-to-DC step-down converter is: configured for operation in a boundary conduction mode; and configured for receiving a DC input current having an input voltage at the input terminal; and configured for causing a DC output current having an output voltage to flow from the positive output terminal through an output load to the negative output terminal; and configured for being integrated with a controller, the controller being configured for applying a pulse-width-modulated voltage to the channel of the transistor for controlling a duty cycle of the DC output current, the duty cycle having an on-time period (T-On) and an off-time period (T-Off), the controller being coupled with a T-On capacitor having a T-On voltage, the controller being configured for charging the T-On capacitor during the T-On period by a regulated T-On current for setting a maximum limit of the T-On period, the controller being configured for initiating the T-Off period when the T-On capacitor becomes charged to a selected maximum limit of the T-On voltage. In the example of the SMPS, the voltage divider is coupled with the input terminal for receiving the input voltage and for reducing the input voltage to a signal voltage being within a selected voltage signal range. In the example of the SMPS, the voltage-to-current converter has a connection with the voltage divider, the voltage-to-current converter including another output terminal being coupled with another transistor having another channel being coupled between another cathode and another anode, the voltage-to-current converter including a grounded precision resistor configured for generating a transconductance voltage, the voltage-to-current converter being configured for inputting the signal voltage and for outputting an error correction voltage being applied to the another channel for generating a signal current appearing at the another anode and defining a transconductance of the voltage-to-current converter and having a current signal value being within a selected current signal range representing the selected voltage signal range. In the example of the SMPS, the current mirror is coupled with the another cathode and is configured for receiving and combining a regulated supply current having a supply voltage together with the signal current as forming a T-On modulation current, with the current mirror being configured for causing the T-On modulation current to be combined with the regulated T-On current to charge the T-On capacitor.

In another example, a switched-mode power supply (SMPS) is accordingly provided wherein the direct current DC-to-DC step-down converter: has the input terminal, and has the positive output terminal, and has the negative output terminal; and is configured for being integrated with a controller as including the transistor having the channel being coupled between the cathode and the anode, the anode being coupled with the grounded current sense resistor.

As a further example, a switched-mode power supply (SMPS) integrated circuit is accordingly provided, including: a direct current (DC)-to-DC step-down converter; a switch; and an element being configured for storage of potential energy in an electric field and having a T-On voltage.

In an additional example, a method of operating a switched-mode power supply (SMPS) is accordingly provided, that includes providing an SMPS having: a direct current (DC)-to-DC step-down converter; a switch; and an element being configured for storage of potential energy in an electric field and having a T-On voltage.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "switched-mode power supply" (SMPS) means an electronic power supply that includes a switching regulator for turning on and off the power to an output load.

Throughout this specification, the term "DC-to-DC step-down converter" means an SMPS that converts a source of direct current (DC) from a first voltage to a second voltage being less than the first voltage, and having a switch being positioned for turning on and off the power to an output load, and that generates a pulse-width-modulated signal for controlling the on- and off-conditions of the switch.

Throughout this specification, the term "controller" means: a device being suitable for generating a pulse-width-modulation (PWM) signal for turning on and off the power to an output load, and which may or may not include a switch being positioned for turning on and off the power to an output load.

Throughout this specification, the term "current mirror" means a circuit having an input terminal and an output terminal, that receives a current flowing in a direction into the input terminal and generates a copy of that current flowing in an opposite direction out of the output terminal.

Throughout this specification, the term "microcontroller" means a multipurpose, programmable device that accepts digital data as input, and processes the digital data according to instructions stored in the programmable device's memory, and provides results as output.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "configured" means "specifically set up for operation especially in a particular way."

Throughout this specification, it is understood that in addition to the examples of ranges, including the examples of ranges for voltages and currents, other ranges may be utilized.

It is understood throughout this specification that numbering of the names of elements as being "first", "second" etcetera, is solely for purposes of clarity in referring to such elements in connection with various examples of lighting systems.

FIG. 1 is a schematic diagram showing examples [100] of an implementation of a switched-mode power supply (SMPS). It is understood throughout this specification that an example [100] of a switched-mode power supply may include any combination of the features that are discussed herein in connection with the examples [100], [200] of switched-mode power supplies, or that are discussed herein in connection with the examples [300] of switched-mode power supply integrated circuits, or that are discussed herein in connection with the examples [400] of methods of operating a switched-mode power supply. Accordingly, the entireties of the discussions herein of the other examples [200] of switched-mode power supplies, and of the examples [300] of the switched-mode power supply integrated circuits, and of the examples [400] of the methods of operating a switched-mode power supply, are hereby incorporated in this discussion of the examples [100] of the switched-mode power supply.

As shown in FIG. 1, the example [100] of the implementation of the switched-mode power supply includes a direct current (DC)-to-DC step-down converter [102] having an input terminal [104], a positive output terminal [106], a negative output terminal [108], and a transistor [110] having a channel [112] being coupled between a cathode [114] and an anode [116], the anode [116] being coupled with a grounded current sense resistor [118]. In the example [100] of the switched-mode power supply, the DC-to-DC step-down converter [102] is configured for operation in a boundary conduction mode. Also, the example [100] of the switched-mode power supply is configured for receiving a DC input current [I-a] having an input voltage [V-1] at the input terminal [104]; and is configured for causing a DC output current [I-b] having an output voltage [V-2] to flow from the positive output terminal [106] through an output load [120] to the negative output terminal [108]. In the example [100] of the switched-mode power supply, the DC-to-DC step-down converter [102] is configured for being integrated with a controller being indicated by a dashed box [122] and configured for applying a pulse-width-modulated voltage [V-3] to the channel [112] of the transistor [110] for controlling a duty cycle of the DC output current [I-b]. Further in the example [100] of the switched-mode power supply, the DC-to-DC step-down converter [102] is configured for being integrated with such a controller [122] with the duty cycle of the DC output current [I-b] as having an on-time period (T-On) and an off-time period (T-Off), the controller [122] being coupled with a T-On capacitor [124] having a T-On voltage [V-4], the controller [122] being configured for charging the T-On capacitor [124] during the T-On period by a regulated T-On current [I-c] for setting a maximum limit of the T-On period, the controller [122] being configured for initiating the T-Off period when the T-On capacitor [124] becomes charged to a selected maximum limit of the T-On voltage [V-4].

In the example [100], the switched-mode power supply further includes a voltage divider indicated by a dashed box [125]. In the example [100], the voltage divider [125] is coupled with the input terminal [104] for receiving the input voltage [V-1] and for reducing the input voltage [V-1] to a signal voltage [V-5] being within a selected voltage signal range.

The example [100] of the switched-mode power supply also includes a voltage-to-current converter indicated by a dashed box [126]. In the example [100] of the switched-mode power supply, the voltage-to-current converter [126] has a connection at a node [127] with the voltage divider [125]. Further in the example [100] of the switched-mode power supply, the voltage-to-current converter [126] includes another output terminal [128] being coupled with another transistor [130] having another channel [132] being coupled between another cathode and another anode [136]. Also in the example [100] of the switched-mode power supply, the voltage-to-current converter [126] includes a grounded precision resistor [138] configured for generating a transconductance voltage [V-6]. The voltage-to-current converter [126] in the example [100] of the switched-mode power supply is configured for inputting the signal voltage [V-5] and for outputting an error correction voltage [V-7] being applied to the another channel [132] for generating a signal current [I-d]. In the example [100] of the switched-mode power supply, the signal current [I-d] appears at the another anode [136] and defines a transconductance of the voltage-to-current converter [126]. Additionally in the example [100] of the switched-mode power supply, the signal current [I-d] has a current signal value being within a selected current signal range representing the selected voltage signal range.

The example [100] of the switched-mode power supply additionally includes a current mirror indicated by a dashed box [139]. In the example [100] of the switched-mode power supply, the current mirror [139] is coupled with the another cathode [134] and is configured for receiving and combining a regulated supply current [I-e] having a supply voltage [V-8] together with the signal current [I-d] as forming a T-On modulation current [I-f]. Further in the example [100] of the switched-mode power supply, the current mirror [139] is configured for causing the T-On modulation current [I-f] to be combined with the regulated T-On current [I-c] to charge the T-On capacitor [124].

In some examples [100] of the switched-mode power supply, the regulated supply current [I-e] having the supply voltage [V-8] may be internally generated by a function [VCC] of the controller [122]. In other examples [100] of the switched-mode power supply, the regulated supply current [I-e] having the supply voltage [V-8] may be otherwise generated by a [VCC] function (not shown) located outside of the controller [122]. In some examples [100] of the switched-mode power supply, the pulse-width-modulated voltage [V-3] may be internally generated by a function [PWM] of the controller [122]. In other examples [100] of the switched-mode power supply, the pulse-width-modulated voltage [V-3] may be otherwise generated by a [PWM] function (not shown) located outside of the controller [122]. In some examples [100] of the switched-mode power supply, the regulated T-On current [I-c] may be internally generated by a function [T-On] of the controller [122]. In other examples [100] of the switched-mode power supply, the regulated T-On current [I-c] may be otherwise generated by a [T-On] function (not shown) located outside of the controller [122].

In some examples [100] of the switched-mode power supply, the voltage divider [125] may include a first resistor [140] having a connection at the node [127] in series with a second resistor [142], with the input voltage [V-1] being applied across the resistors [140], [142] and the signal voltage [V-5] appearing at the connection [127] between them. In further examples [100] of the switched-mode power supply, the voltage divider [125] may further include a capacitor (not shown) in parallel with the second resistor [142], for filtering high frequency noise.

In additional examples [100] of the switched-mode power supply, the selected voltage signal may have a voltage range being between about one (1) volt and about five (5) volts. In other examples [100] of the switched-mode power supply, the selected voltage signal may have a voltage range being between about 0.3 volt and about 1.2 volts. In some examples [100] of the switched-mode power supply, the input voltage [V-1] may have a root-mean-square (rms) value of the input voltage [V-1] as being within a range of between about 100 volts and about 277 volts. In further examples [100] of the switched-mode power supply, the supply voltage [V-8] of the regulated supply current [I-e] may be within a range of between about eight (8) volts and about fourteen (14) volts. In additional examples [100] of the switched-mode power supply, the selected maximum limit of the T-On voltage [V-4] may be within a range of between about zero (0) volts and about ten (10) volts. In some of those examples [100] of the switched-mode power supply, the selected maximum limit of the T-On voltage [V-4] may be within a range of between about one (1) volt and about four (4) volts. In further of those examples [100] of the switched-mode power supply, the selected maximum limit of the T-On voltage [V-4] may be about four (4) volts. In some examples [100] of the switched-mode power supply, the selected voltage signal may have a voltage range being between about one (1) volt and about five (5) volts; and the current signal of the signal current [I-d] may have a magnitude being within a representative selected range of between about one hundred micro-amps (100 μA) and about five hundred micro-amps (500 μA).

In further examples [100] of the switched-mode power supply, the voltage-to-current converter [126] may include a transconductance amplifier [144]. Also in those further examples [100] of the switched-mode power supply, the transconductance amplifier [144] may include a single-supply operational amplifier [146] having a positive input terminal [148] and a negative input terminal [150]; and the transconductance amplifier [144] may include an amplifier output terminal [128]. In some of those examples [100] of the switched-mode power supply, the signal voltage [V-5] may be coupled with the positive input terminal [148], and the negative input terminal [150] may be coupled in a feedback loop [152] with the another anode [136] of the another transistor [130]. In those examples [100] of the switched-mode power supply, the negative input terminal [150] may also be coupled in the feedback loop [152] with the grounded precision resistor [138] for defining the transconductance of the transconductance amplifier [144]. Additionally in those examples [100] of the switched-mode power supply, the output terminal [128] may be configured for applying the error correction voltage [V-7] to the another channel [132] of the another transistor [130]. In some of those examples [100] of the switched-mode power supply, the precision resistor [138] may be coupled in series with a fixed voltage reference [154] having a fixed voltage [V-9] contributing to the signal current [I-d] appearing at the another anode [136]. In additional examples [100] of the switched-mode power supply, the fixed voltage reference [154] may be, or may include (not shown), a shunt voltage reference circuit. In further examples [100] of the switched-mode power supply, the fixed voltage reference [154] may provide the fixed voltage [V-9] as being within a range of between about one (1) volt and about eleven (11) volts, appearing between the precision resistor [138] and the shunt voltage reference circuit [154]. In further examples [100] of the switched-mode power supply, the fixed voltage reference [154] may provide the fixed voltage [V-9] as being within a range having a lower limit of about one (1) volt and having an upper limit of about the supply voltage [V-8] minus one (1) volt, appearing between the precision resistor [138] and the shunt voltage reference circuit [154]. In other examples [100] of the switched-mode power supply, the fixed voltage reference [154] may provide the fixed voltage [V-9] as being about 1.25 volts, appearing between the precision resistor [138] and the shunt voltage reference circuit [154].

In additional examples [100] of the switched-mode power supply, the transistor [110] may be a field effect transistor [110] having a gate [156], and the channel [112] may be coupled between the anode [116] and the cathode [114] as respectively being a source [116] and a drain [114]. In some of those examples [100] of the switched-mode power supply, the field effect transistor [110] may be an insulated gate field effect transistor [110]. In further ones of those examples [100] of the switched-mode power supply, the insulated gate field effect transistor may be a metal oxide semiconductor field effect transistor (MOSFET) [110]. In additional ones of those examples [100] of the switched-mode power supply, the MOSFET may be an enhancement-mode n-channel MOSFET [110].

In further examples [100] of the switched-mode power supply, the another transistor [130] may be a bipolar junction transistor [130] having a base [158]; and the another channel [132] may be coupled between the another anode [136] and the another cathode [134] as respectively being an emitter [136] and a collector [134]; and the another output terminal [128] may be coupled with the base [158] of the another transistor [130]. In some of those examples [100] of the switched-mode power supply, the bipolar junction transistor [130] may be an n-channel transistor [130].

In additional examples [100] of the switched-mode power supply, the current mirror [139] may include a third transistor [141] having a third channel being coupled between a third cathode and a third anode; and the current mirror [139] may include a fourth transistor [143] having a fourth channel being coupled between a fourth cathode and a fourth anode. Further in those examples [100] of the switched-mode power supply, the another cathode [134] may be coupled with the third cathode; and the fourth cathode may be coupled with the T-On capacitor [124]. In additional examples [100] of the switched-mode power supply, the current mirror [139] may be a Wilson current mirror [139] including a fifth transistor [145] having a fifth channel being coupled between a fifth cathode and a fifth anode; and the another cathode [134] may be coupled with the third cathode; and the fifth cathode may be coupled with the T-On capacitor [124]. In some of those examples [100] of the switched-mode power supply, each of the third, fourth and fifth transistors [141], [143], [145] may be a bipolar junction transistor. In additional ones of those examples [100] of the switched-mode power supply, each of the third, fourth and fifth bipolar junction transistors [141], [143], [145] may be a p-channel transistor.

In additional examples [100] of the switched-mode power supply, the DC-to-DC step-down converter [102] may include an inductor [160] having a first end [162] and a second end [164]. In some of those examples [100] of the switched-mode power supply, the first end [162] of the inductor [160] may be coupled with the negative output terminal [108]; and the second end [164] of the inductor [160] may be coupled at another node [166] with the cathode [114] of the transistor [110]. In some of those examples [100] of the switched-mode power supply, the DC-to-DC step-down converter [102] may include a freewheel diode [168] being coupled between the input terminal [104] and the another node [166], and also being coupled with the cathode [114] of the transistor [110]. In some of those examples [100] of the switched-mode power supply, the DC-to-DC step-down converter [102] may include an output capacitor [170] being coupled between the positive output terminal [106] and the negative output terminal [108]. In further examples [100] of the switched-mode power supply, the DC-to-DC step-down converter [102] may include a buck converter circuit, or a step-down buck-boost converter circuit (not shown), or a Sepic converter circuit (not shown), or a auk converter circuit (not shown). In additional examples [100] of the switched-mode power supply, the DC-to-DC step-down converter [102] may be configured for charging the inductor [160] and charging the output capacitor [170] during the T-On period; and the DC-to-DC step-down converter [102] may be configured for discharging the inductor [160] and discharging the output capacitor [170] during the T-Off period. In other examples [100] of the switched-mode power supply, the controller [122] may be configured for initiating the T-On period when the inductor [160] is discharged. In some examples [100] of the switched-mode power supply, the DC-to-DC step-down converter [102] may include a transformer with the inductor [160] being a primary winding of the transformer [160], and the transformer [160] may include a secondary winding (not shown).

In further examples [100], the switched-mode power supply may include a rectifying circuit [172] having a diode bridge [174] being coupled with the input terminal [104]; and the rectifying circuit [172] may be configured for rectifying a mains alternating current (AC) input voltage [176]. In some of those examples [100] of the switched-mode power supply, the rectifying circuit [172] may include a full-wave rectifier [174]. In some of those examples [100]

of the switched-mode power supply, the rectified input voltage [V-1] may have a root-mean-square (rms) value of the input voltage [V-1] as being within a range of between about 100 volts and about 277 volts. In additional examples [100] of the switched-mode power supply, the controller [122] may be configured for applying the pulse-width-modulated voltage [V-3] as being in phase with the input voltage [V-1]. In further examples [100] of the switched-mode power supply, the controller [122] may be configured for applying the pulse-width-modulated voltage [V-3] as being in a peak current mode.

In further examples [100] of the switched-mode power supply, the controller [122] may be configured for regulating the output voltage [V-2] independently of the input voltage [V-1].

In some examples [100] of the switched-mode power supply, the output load [120] may include a semiconductor light-emitting device.

In additional examples [100] of the switched-mode power supply, the controller [122] may be integrated with the DC-to-DC step-down converter [102]. In further examples [100] of the switched-mode power supply, the controller [122] may include an integrated circuit chip. In other examples [100] of the switched-mode power supply, the DC-to-DC step-down converter [102], and the voltage divider [125], and the voltage-to-current converter [126], and the current mirror [139] may be included in an integrated circuit [100].

Figure 2:
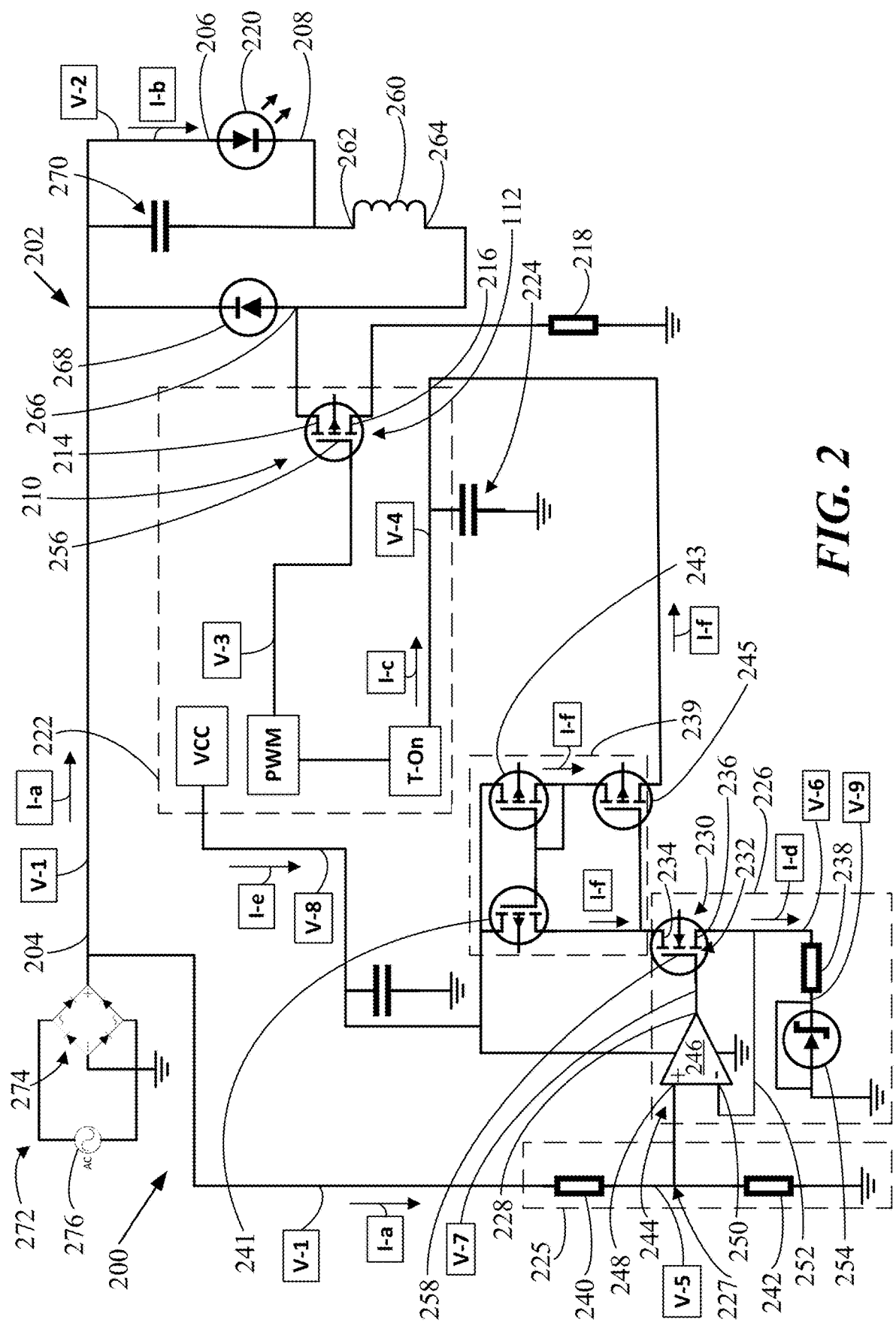
FIG. 2 is a schematic diagram showing examples [200] of another implementation of a switched-mode power supply (SMPS).

FIG. 2 is a schematic diagram showing examples [200] of another implementation of a switched-mode power supply (SMPS). It is understood throughout this specification that an example [200] of a switched-mode power supply may include any combination of the features that are discussed herein in connection with the examples [100], [200] of switched-mode power supplies, or that are discussed herein in connection with the examples [300] of switched-mode power supply integrated circuits, or that are discussed herein in connection with the examples [400] of methods of operating a switched-mode power supply. Accordingly, the entireties of the discussions herein of the other examples [100] of switched-mode power supplies, and of the examples [300] of switched-mode power supply integrated circuits, and of the examples [400] of the methods of operating a switched-mode power supply, are hereby incorporated in this discussion of the examples [200] of the switched-mode power supply.

As shown in FIG. 2, the examples [200] of the implementation of the switched-mode power supply include a direct current (DC)-to-DC step-down converter [202] having an input terminal [204], a positive output terminal [206], and a negative output terminal [208]. In the example [200] of the switched-mode power supply, the DC-to-DC step-down converter [202] is configured for operation in a boundary conduction mode. Also, the example [200] of the switched-mode power supply is configured for receiving a DC input current [I-a] having an input voltage [V-1] at the input terminal [204]; and is configured for causing a DC output current [I-b] having an output voltage [V-2] to flow from the positive output terminal [206] through an output load [220] to the negative output terminal [208]. In the example [200] of the switched-mode power supply, the DC-to-DC step-down converter [202] is configured for being integrated with a controller being indicated by a dashed box [222] including a transistor [210] having a channel [212] being coupled between a cathode [214] and an anode [216], the anode [216] being coupled with a grounded current sense resistor [218]. In the example [200] of the switched-mode power supply, the DC-to-DC step-down converter [202] also is configured for applying a pulse-width-modulated voltage [V-3] to the channel [212] of the transistor [210] for controlling a duty cycle of the DC output current [I-b]. Further in the example [200] of the switched-mode power supply, the DC-to-DC step-down converter [202] is configured for being integrated with such a controller [222] with the duty cycle of the DC output current [I-b] as having an on-time period (T-On) and an off-time period (T-Off), the controller [222] being coupled with a T-On capacitor [224] having a T-On voltage [V-4], the controller [222] being configured for charging the T-On capacitor [224] during the T-On period by a regulated T-On current [I-c] for setting a maximum limit of the T-On period, the controller [222] being configured for initiating the T-Off period when the T-On capacitor [224] becomes charged to a selected maximum limit of the T-On voltage [V-4].

In the example [200], the switched-mode power supply further includes a voltage divider indicated by a dashed box [225]. In the example [200], the voltage divider [225] is coupled with the input terminal [204] for receiving the input voltage [V-1] and for reducing the input voltage [V-1] to a signal voltage [V-5] being within a selected voltage signal range.

The example [200] of the switched-mode power supply also includes a voltage-to-current converter indicated by a dashed box [226]. In the example [200] of the switched-mode power supply, the voltage-to-current converter [226] has a connection at a node [227] with the voltage divider [225]. Further in the example [200] of the switched-mode power supply, the voltage-to-current converter [226] includes another output terminal [228] being coupled with another transistor [230] having another channel [232] being coupled between another cathode [234] and another anode [236]. Also in the example [200] of the switched-mode power supply, the voltage-to-current converter [226] includes a grounded precision resistor [238] configured for generating a transconductance voltage [V-6]. The voltage-to-current converter [226] in the example [200] of the switched-mode power supply is configured for inputting the signal voltage [V-5] and for outputting an error correction voltage [V-7] being applied to the another channel [232] for generating a signal current [I-d]. In the example [200] of the switched-mode power supply, the signal current [I-d] appears at the another anode [236] and defines a transconductance of the voltage-to-current converter [226]. Additionally in the example [200] of the switched-mode power supply, the signal current [I-d] has a current signal value being within a selected current signal range representing the selected voltage signal range.

The example [200] of the switched-mode power supply additionally includes a current mirror indicated by a dashed box [239]. In the example [200] of the switched-mode power supply, the current mirror [239] is coupled with the another cathode [234] and is configured for receiving and combining a regulated supply current [I-e] having a supply voltage [V-8] together with the signal current [I-d] as forming a T-On modulation current [I-f]. Further in the example [200] of the switched-mode power supply, the current mirror [239] is configured for causing the T-On modulation current [I-f] to be combined with the regulated T-On current [I-c] to charge the T-On capacitor [224].

In some examples [200] of the switched-mode power supply, the regulated supply current [I-e] having the supply voltage [V-8] may be internally generated by a function [VCC] of the controller [222]. In other examples [200] of the switched-mode power supply, the regulated supply current

[I-e] having the supply voltage [V-8] may be otherwise generated by a [VCC] function (not shown) located outside of the controller [222]. In some examples [200] of the switched-mode power supply, the pulse-width-modulated voltage [V-3] may be internally generated by a function [PWM] of the controller [222]. In other examples [200] of the switched-mode power supply, the pulse-width-modulated voltage [V-3] may be otherwise generated by a [PWM] function (not shown) located outside of the controller [222]. In some examples [200] of the switched-mode power supply, the regulated T-On current [I-c] may be internally generated by a function [T-On] of the controller [222]. In other examples [200] of the switched-mode power supply, the regulated T-On current [I-c] may be otherwise generated by a [T-On] function (not shown) located outside of the controller [222].

In some examples [200] of the switched-mode power supply, the voltage divider [225] may include a first resistor [240] having a connection at the node [227] in series with a second resistor [242], with the input voltage [V-1] being applied across the resistors [240], [242] and the signal voltage [V-5] appearing at the connection [227] between them. In further examples [200] of the switched-mode power supply, the voltage divider [225] may further include a capacitor (not shown) in parallel with the second resistor [242], for filtering high frequency noise.

In additional examples [200] of the switched-mode power supply, the selected voltage signal may have a voltage range being between about one (1) volt and about five (5) volts. In other examples [200] of the switched-mode power supply, the selected voltage signal may have a voltage range being between about 0.3 volt and about 1.2 volts. In some examples [200] of the switched-mode power supply, the input voltage [V-1] may have a root-mean-square (rms) value of the input voltage [V-1] as being within a range of between about 100 volts and about 277 volts. In further examples [200] of the switched-mode power supply, the supply voltage [V-8] of the regulated supply current [I-e] may be within a range of between about eight (8) volts and about fourteen (14) volts. In additional examples [200] of the switched-mode power supply, the selected maximum limit of the T-On voltage [V-4] may be within a range of between about zero (0) volts and about ten (10) volts. In some of those examples [200] of the switched-mode power supply, the selected maximum limit of the T-On voltage [V-4] may be within a range of between about one (1) volt and about four (4) volts. Further in some of those examples [200] of the switched-mode power supply, the selected maximum limit of the T-On voltage [V-4] may be about four (4) volts. In some examples [200] of the switched-mode power supply, the selected voltage signal may have a voltage range being between about one (1) volt and about five (5) volts; and the current signal of the signal current [I-d] may have a magnitude being within a representative selected range of between about one hundred micro-amps (100 µA) and about five hundred micro-amps (500 µA).

In further examples [200] of the switched-mode power supply, the voltage-to-current converter [226] may include a transconductance amplifier [244]. Also in those further examples [200] of the switched-mode power supply, the transconductance amplifier [244] may include a single-supply operational amplifier [246] having a positive input terminal [248] and a negative input terminal [250]; and the transconductance amplifier [244] may include an amplifier output terminal [228]. In some of those examples [200] of the switched-mode power supply, the signal voltage [V-5] may be coupled with the positive input terminal [248], and the negative input terminal [250] may be coupled in a feedback loop [252] with the another anode [236] of the another transistor [230]. In those examples [200] of the switched-mode power supply, the negative input terminal [250] may also be coupled in the feedback loop [252] with the grounded precision resistor [238] for defining the transconductance of the transconductance amplifier [244]. Additionally in those examples [200] of the switched-mode power supply, the output terminal [228] may be configured for applying the error correction voltage [V-7] to the another channel [232] of the another transistor [230]. In some of those examples [200] of the switched-mode power supply, the precision resistor [238] may be coupled in series with a fixed voltage reference [254] having a fixed voltage [V-9] contributing to the signal current [I-d] appearing at the another anode [236]. In additional examples [200] of the switched-mode power supply, the fixed voltage reference [254] may be, or may include (not shown), a shunt voltage reference circuit. In further examples [200] of the switched-mode power supply, the fixed voltage reference [254] may provide the fixed voltage [V-9] as being within a range of between about one (1) volt and about eleven (11) volts, appearing between the precision resistor [238] and the shunt voltage reference circuit [254]. In further examples [200] of the switched-mode power supply, the fixed voltage reference [254] may provide the fixed voltage [V-9] as being within a range having a lower limit of about one (1) volt and having an upper limit of about the supply voltage [V-8] minus one (1) volt, appearing between the precision resistor [238] and the shunt voltage reference circuit [254]. In other examples [200] of the switched-mode power supply, the fixed voltage reference [254] may provide the fixed voltage [V-9] as being about 1.25 volts, appearing between the precision resistor [238] and the shunt voltage reference circuit [254].

In additional examples [200] of the switched-mode power supply, the transistor [210] may be a field effect transistor [210] having a gate [256], and the channel [212] may be coupled between the anode [216] and the cathode [214] as respectively being a source [216] and a drain [214]. In some of those examples [200] of the switched-mode power supply, the field effect transistor [210] may be an insulated gate field effect transistor [210]. In further ones of those examples [200] of the switched-mode power supply, the insulated gate field effect transistor may be a metal oxide semiconductor field effect transistor (MOSFET) [210]. In additional ones of those examples [200] of the switched-mode power supply, the MOSFET may be an enhancement-mode n-channel MOSFET [210].

In further examples [200] of the switched-mode power supply, the another transistor [230] may be a bipolar junction transistor [230] having a base [258]; and the another channel [232] may be coupled between the another anode [236] and the another cathode [234] as respectively being an emitter [236] and a collector [234]; and the another output terminal [228] may be coupled with the base [258] of the another transistor [230]. In some of those examples [200] of the switched-mode power supply, the bipolar junction transistor [230] may be an n-channel transistor.

In additional examples [200] of the switched-mode power supply, the current mirror [239] may include a third transistor [241] having a third channel being coupled between a third cathode and a third anode; and the current mirror [239] may include a fourth transistor [243] having a fourth channel being coupled between a fourth cathode and a fourth anode. Further in those examples [200] of the switched-mode power supply, the another cathode [234] may be coupled with the third cathode; and the fourth cathode may be coupled with the T-On capacitor [224]. In additional examples [200] of the switched-mode power supply, the current mirror [239] may be a Wilson current mirror [239] including a fifth transistor [245] having a fifth channel being coupled between a fifth cathode and a fifth anode; and the another cathode [234] may be coupled with the third cathode; and the fifth cathode may be coupled with the T-On capacitor [224]. In some of those examples [200] of the switched-mode power supply, each of the third, fourth and fifth transistors [241], [243], [245] may be a bipolar junction transistor. In additional ones of those examples [200] of the switched-mode power supply, each of the third, fourth and fifth bipolar junction transistors [241], [243], [245] may be a p-channel transistor.

In additional examples [200] of the switched-mode power supply, the DC-to-DC step-down converter [202] may include an inductor [260] having a first end [262] and a second end [264]. In some of those examples [200] of the switched-mode power supply, the first end [262] of the inductor [260] may be coupled with the negative output terminal [208]; and the second end [264] of the inductor [260] may be coupled at another node [266] with the cathode [214] of the transistor [210]. In some of those examples [200] of the switched-mode power supply, the DC-to-DC step-down converter [202] may include a freewheel diode [268] being coupled between the input terminal [204] and the another node [266], and also being coupled with the cathode [214] of the transistor [210]. In some of those examples [200] of the switched-mode power supply, the DC-to-DC step-down converter [202] may include an output capacitor [270] being coupled between the positive output terminal [206] and the negative output terminal [208]. In further examples [200] of the switched-mode power supply, the DC-to-DC step-down converter [202] may include a buck converter circuit, or a step-down buck-boost converter circuit (not shown), or a Sepic converter circuit (not shown), or a auk converter circuit (not shown). In additional examples [200] of the switched-mode power supply, the DC-to-DC step-down converter [202] may be configured for charging the inductor [260] and charging the output capacitor [270] during the T-On period; and the DC-to-DC step-down converter [202] may be configured for discharging the inductor [260] and discharging the output capacitor [270] during the T-Off period. In other examples [200] of the switched-mode power supply, the controller [222] may be configured for initiating the T-On period when the inductor [260] is discharged. In some examples [200] of the switched-mode power supply, the DC-to-DC step-down converter [202] may include a transformer and the inductor [260] may be a primary winding of the transformer, and the transformer [260] may include a secondary winding (not shown).

In further examples [200], the switched-mode power supply may include a rectifying circuit [272] having a diode bridge [274] being coupled with the input terminal [204]; and the rectifying circuit [272] may be configured for rectifying a mains alternating current (AC) input voltage [276]. In some of those examples [200] of the switched-mode power supply, the rectifying circuit may include a full-wave rectifier [274]. In some of those examples [200] of the switched-mode power supply, the rectified input voltage [V-1] may have a root-mean-square (rms) value of the input voltage [V-1] as being within a range of between about 100 volts and about 277 volts.

In additional examples [200] of the switched-mode power supply, the controller [222] may be configured for applying the pulse-width-modulated voltage [V-3] as being in phase with the input voltage [V-1]. In further examples [200] of the switched-mode power supply, the controller [222] may be configured for applying the pulse-width-modulated voltage [V-3] as being in a peak current mode. In further examples [200] of the switched-mode power supply, the controller may be configured for regulating the output voltage [V-2] independently of the input voltage [V-1].

In some examples [200] of the switched-mode power supply, the output load [220] may include a semiconductor light-emitting device.

In additional examples [200] of the switched-mode power supply, the controller [222] may be integrated with the DC-to-DC step-down converter [202]. In further examples [200] of the switched-mode power supply, the controller [222] may include an integrated circuit chip. In other examples [200] of the switched-mode power supply, the DC-to-DC step-down converter [202], and the voltage divider [225], and the voltage-to-current converter [226], and the current mirror [239] may be included in an integrated circuit [200].

Figure 3:
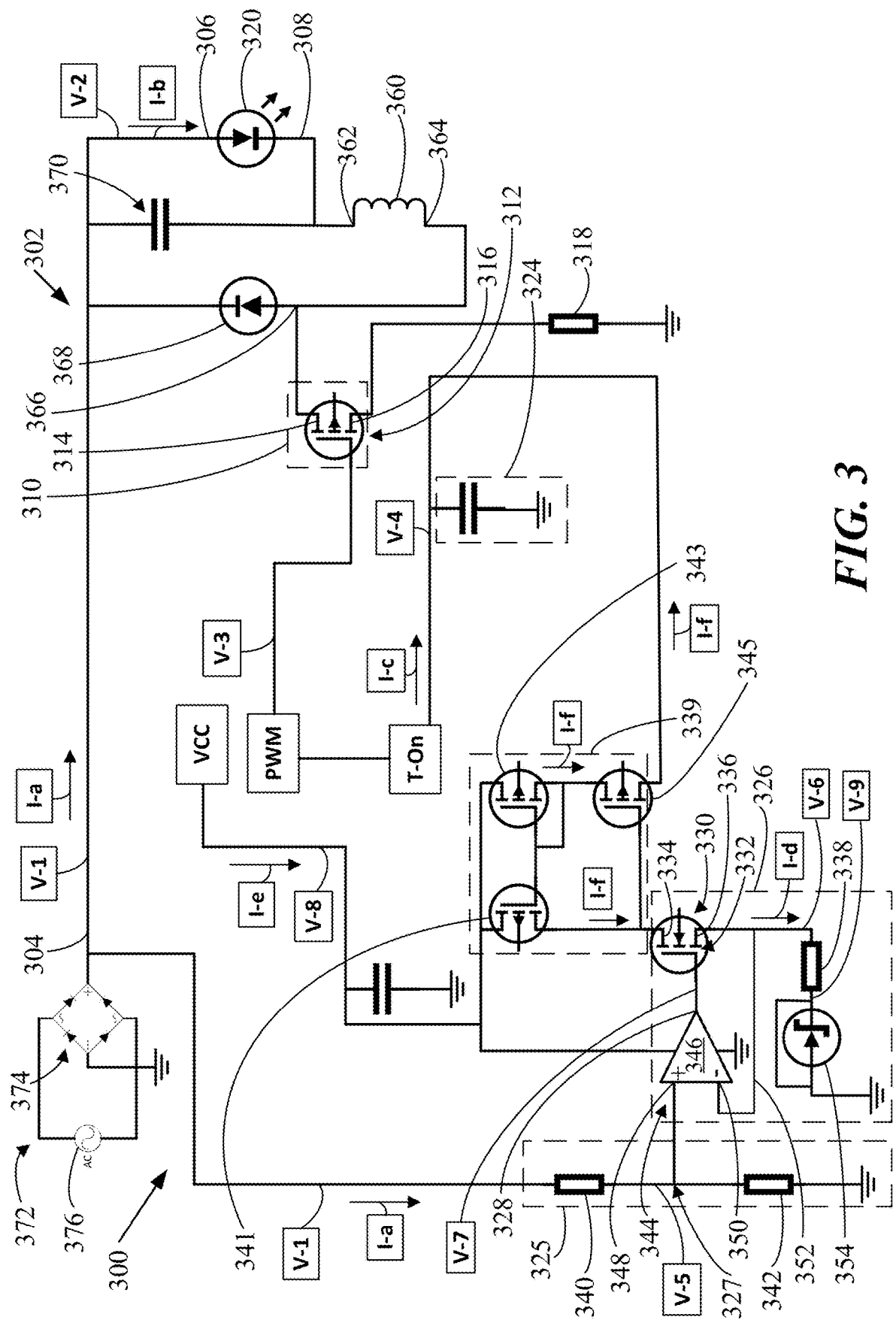
FIG. 3 is a schematic diagram showing examples [300] of an implementation of a switched-mode power supply (SMPS) integrated circuit.

FIG. 3 is a schematic diagram showing examples [300] of an implementation of a switched-mode power supply (SMPS) integrated circuit. It is understood throughout this specification that the examples [300] of a switched-mode power supply integrated circuit may include any combination of the features that are discussed herein in connection with the examples [100], [200] of switched-mode power supplies, or that are discussed herein in connection with these examples [300] of switched-mode power supply integrated circuits, or that are discussed herein in connection with examples [400] of methods of operating a switched-mode power supply. Accordingly, the entireties of the discussions herein of the examples [100], [200] of switched-mode power supplies, and of the examples [400] of the methods of operating a switched-mode power supply, are hereby incorporated in this discussion of the examples [300] of the switched-mode power supply integrated circuit.

As shown in FIG. 3, the examples [300] of the implementation of the switched-mode power supply (SMPS) integrated circuit include a direct current DC-to-DC step-down converter [302], a switch indicated by a dashed box [310], and an element indicated by a dashed box [324] being configured for storage of potential energy in an electric field and having a T-On voltage [V-4]. In the examples [300] of the SMPS integrated circuit, the SMPS [300] is configured to receive a DC input current [I-a] having an input voltage [V-1] and to output, through an output load [320], a DC output current [I-b] having an output voltage [V-2]. Also in the examples [300] of the SMPS integrated circuit, the SMPS is configured to operate in a boundary conduction mode by applying a pulse-width-modulated voltage [V-3] to the switch [310] for controlling a duty cycle of the DC output current [I-b], the duty cycle having an on-time period (T-On) and an off-time period (T-Off). The SMPS in the examples [300] of the SMPS integrated circuit is further configured to generate a regulated T-On current [I-c] for setting a maximum limit of the on-time period (T-On) of the duty cycle. In the examples [300] of the SMPS integrated circuit, the SMPS [300] is configured to monitor the input voltage [V-1] by reducing the input voltage [V-1] to a signal voltage [V-5] being within a selected voltage signal range. Additionally in the examples [300] of the SMPS integrated circuit, the SMPS [300] is configured to convert the signal voltage [V-5] to a signal current [I-d] having a current signal value being within a selected current signal range representing the selected voltage signal range. The SMPS [300] in the examples [300] of the SMPS integrated circuit additionally is configured to output a T-On modulation current [I-f] including the signal current [I-d]. In the examples [300] of the SMPS integrated circuit, the SMPS [300] is configured to combine together the T-On modulation current [I-f] with the regulated T-On current [I-c] during the T-On period to store potential energy in the element [324], while causing the SMPS [300] to monitor the T-On voltage [V-4] of the element [324]. The SMPS [300] in the examples [300] of the SMPS integrated circuit also is configured to initiate the T-Off period when the potential energy stored in the element [324] reaches a selected maximum limit of the T-On voltage [V-4].

In some examples [300] of the SMPS integrated circuit, the element [324] that is configured for storage of potential energy in the electric field may include a T-On capacitor [324].

In further examples [300], the SMPS integrated circuit may be in the form of a microcontroller [300], an application-specific integrated circuit (ASIC) [300], a digital signal processor (DSP) [300], or a field-programmable gate array (FPGA) [300].

In additional examples [300], the SMPS integrated circuit may include a voltage-to-current converter indicated by a dashed box [326] being configured to receive the signal voltage [V-5] and to output an error correction voltage [V-7] for generating the signal current [I-d] as defining a transconductance of the voltage-to-current converter [326]. In some of those examples [300], the voltage-to-current convertor [326] may include a transconductance amplifier [344]. Further, in some of those examples [300] of the SMPS integrated circuit, the transconductance amplifier [344] may include a single-supply operational amplifier [346] having a positive input terminal [348] and a negative input terminal [350] and including an amplifier output terminal [328]. Also, in the single-supply operational amplifier [346] of those examples [300] of the SMPS integrated circuit, the signal voltage [V-5] may be coupled with the positive input terminal [348], and the negative input terminal [350] may be coupled in a feedback loop [352] with another anode [336] of another transistor [330] having another cathode [334]. Further, in the single-supply operational amplifier [346] of those examples [300] of the SMPS integrated circuit, the negative input terminal [350] may be coupled with a grounded precision resistor [338] for generating a transconductance voltage [V-6]; and the output terminal [328] may be configured for applying the error correction voltage [V-7] to another channel [332] of the another transistor [330].

In further examples [300] of the SMPS integrated circuit, the precision resistor [338] of the transconductance amplifier [344] may be coupled in series with a fixed voltage reference [354] having a fixed voltage [V-9] contributing to the signal current [I-d] appearing at the another anode [336]. In some of those examples [300] of the SMPS integrated circuit, the fixed voltage reference [354] may include a shunt voltage reference circuit [354]. Further in some of those examples [300] of the SMPS integrated circuit, the transconductance amplifier [344] may be configured for providing the fixed voltage [V-9] as being within a range having a lower limit of about one (1) volt and having an upper limit of about the supply voltage [V-8] minus one (1) volt, appearing between the precision resistor [338] and the shunt voltage reference circuit [354]. Additionally in some of those examples [300] of the SMPS integrated circuit, the transconductance amplifier [344] may be configured for providing the fixed voltage [V-9] as being within a range of between about one (1) volt and about eleven (11) volts, appearing between the precision resistor [338] and the shunt voltage reference circuit [354]. Further in some of those examples [300] of the SMPS integrated circuit, the transconductance amplifier [344] may be configured for providing the fixed voltage [V-9] as being about 1.25 volts, appearing between the precision resistor [338] and the shunt voltage reference circuit [354].

In additional examples [300], the SMPS integrated circuit may be configured for combining a regulated supply current [I-e] having a supply voltage [V-8] together with the signal current [I-d] as forming the T-On modulation current [I-f]. Further in those examples [300], the SMPS integrated circuit [300] may be configured to regulate the supply voltage [V-8] of the regulated supply current [I-e] as being within a range of between about eight (8) volts and about fourteen (14) volts.

In some examples [300] of the SMPS integrated circuit, the regulated supply current [I-e] having the supply voltage [V-8] may be generated by a [VCC] function. In further examples [300] of the SMPS integrated circuit, the pulse-width-modulated voltage [V-3] may be generated by a [PWM] function. In additional examples [300] of the SMPS integrated circuit, the regulated T-On current [I-c] may be generated by a [T-On] function.

In other examples [300], the SMPS integrated circuit [300] may include a current mirror indicated by a dashed box [339]; and the current mirror [339] may be configured to receive and combine the regulated supply current [I-e] together with the signal current [I-d] as forming the T-On modulation current [I-f]. Additionally in those examples [300] of the SMPS integrated circuit, the current mirror [339] may be configured to receive and combine the T-On modulation current [I-f] together with the regulated T-On current [I-c].

In additional examples [300] of the SMPS integrated circuit, the current mirror [339] may include a third transistor [341] having a third channel being coupled between a third cathode and a third anode; and the current mirror [339] may include a fourth transistor [343] having a fourth channel being coupled between a fourth cathode and a fourth anode. Further in those examples [300] of the SMPS integrated circuit, the another cathode [334] may be coupled with the third cathode; and the fourth cathode may be coupled with the T-On capacitor [324]. In additional examples [300] of the SMPS integrated circuit, the current mirror [339] may be a Wilson current mirror [339] including a fifth transistor [345] having a fifth channel being coupled between a fifth cathode and a fifth anode; and the another cathode [334] may be coupled with the third cathode; and the fifth cathode may be coupled with the T-On capacitor [324]. In some of those examples [300] of the SMPS integrated circuit, each of the third, fourth and fifth transistors [341], [343], [345] may be a bipolar junction transistor. In additional ones of those examples [300] of the SMPS integrated circuit, each of the third, fourth and fifth bipolar junction transistors [341], [343], [345] may be a p-channel transistor.

In some examples [300] of the switched-mode power supply integrated circuit, the SMPS [300] may include a voltage divider indicated by a dashed box [325] for monitoring the input voltage [V-1] by reducing the input voltage [V-1] to the signal voltage [V-5]; and the voltage divider [325] may include, for example, a first resistor [340] having a connection in series with a second resistor [342], with the input voltage [V-1] being applied across the resistors [340], [342] and the signal voltage [V-5] appearing at a connection [327] between them.

In some examples [300], the SMPS integrated circuit may be configured to receive the DC input current [I-a] with the input voltage [V-1] as having a root-mean-square (rms)

value of the input voltage [V-1] being within a range of between about 100 volts and about 277 volts. In further examples [300], the SMPS integrated circuit may be configured for regulating the output voltage [V-2] independently of the input voltage [V-1].

In additional examples [300], the SMPS integrated circuit may be configured for reducing the input voltage [V-1] to the selected voltage signal range as being between about one (1) volt and about five (5) volts. In some of those examples [300], the SMPS integrated circuit may be configured for reducing the input voltage [V-1] to the selected voltage signal range as being between about 0.3 volt and about 1.2 volts. As further examples [300], the SMPS integrated circuit may be configured for reducing the input voltage [V-1] to a signal voltage [V-5] being within a selected voltage signal range of between about one (1) volt and about five (5) volts; and the SMPS integrated circuit [300] may be configured for converting the signal voltage [V-5] to a signal current [I-d] having a magnitude being within a selected representative current signal range of between about one hundred micro-amps (100 μA) and about five hundred micro-amps (500 μA).

In other examples [300], the SMPS integrated circuit may be configured to initiate the T-Off period when the potential energy stored in the element [324] reaches a selected maximum limit of the T-On voltage [V-4] as being within a range of between about zero (0) volts and about ten (10) volts. In some of those examples [300], the SMPS integrated circuit may be configured to initiate the T-Off period when the potential energy stored in the element [324] reaches a selected maximum limit of the T-On voltage [V-4] as being within a range of between about one (1) volt and about four (4) volts. Further in some of those examples [300], the SMPS integrated circuit may be configured to initiate the T-Off period when the potential energy stored in the element [324] reaches a selected maximum limit of the T-On voltage [V-4] as being about four (4) volts.

In further examples [300] of the SMPS integrated circuit, the DC-to-DC step-down converter [302] may include an inductor [360] having a first end [362] and a second end [364]. In some of those examples [300] of the SMPS integrated circuit, the switch [310] may include a transistor [310] having a channel [312] being coupled between a cathode [314] and an anode [316]; and the anode [316] may be coupled with a grounded current sense resistor [318]. Also in some of those examples [300], the SMPS integrated circuit may be configured for receiving the DC input current [I-a] at an input terminal [304], and for causing the DC output current [I-b] to flow from a positive output terminal [306] through the output load [320] to a negative output terminal [308]. Further in some of those examples [300] of the SMPS integrated circuit, the first end [362] of the inductor [360] may be coupled with the negative output terminal [308]; and the second end [364] of the inductor [360] may be coupled at another node [366] with the cathode [314] of the transistor [310]. Additionally in some of those examples [300] of the SMPS integrated circuit, the DC-to-DC step-down converter [302] may include a freewheel diode [368] being coupled between the input terminal [304] and the node [366], and being coupled with the cathode [314] of the transistor [310]. Also in some of those examples [300] of the SMPS integrated circuit, the DC-to-DC step-down converter [302] may include an output capacitor [370] being coupled between the positive output terminal [306] and the negative output terminal [308]. Further in some of those examples, the SMPS integrated circuit [300] may be configured for causing the DC-to-DC step-down converter [302] to: charge the inductor [360] and charge the output capacitor [370] during the T-On period; and to discharge the inductor [360] and discharge the output capacitor [370] during the T-Off period. In some of those examples, the SMPS integrated circuit [300] may be configured for initiating the T-On period when the inductor [360] is discharged.

In other examples [300] of the SMPS integrated circuit, the DC-to-DC step-down converter [302] may include a buck converter circuit [302], or a step-down buck-boost converter circuit (not shown), or a Sepic converter circuit (not shown), or a auk converter circuit (not shown). In further examples, the SMPS integrated circuit [300] may be configured for applying the pulse-width-modulated voltage [V-3] as being in phase with the input voltage [V-1]. In further examples, the SMPS integrated circuit may be configured for applying the pulse-width-modulated voltage [V-3] as being in a peak current mode.

In additional examples, the SMPS integrated circuit [300] may include a rectifying circuit [372] being configured for rectifying a mains alternating current (AC) input voltage [376]. In some of those examples of the SMPS integrated circuit [300], the rectifying circuit [372] may include a full-wave rectifier [374]. In some of those examples [300] of the switched-mode power supply, the rectified input voltage [V-1] may have a root-mean-square (rms) value of the input voltage [V-1] as being within a range of between about 100 volts and about 277 volts.

In some examples, the SMPS integrated circuit [300] may be configured for output of the DC output current [I-b] through an output load [320] including a semiconductor light-emitting device.

Referring still to FIG. 3, two examples of modified versions of the examples [300] of the switched-mode power supply (SMPS) integrated circuit may be made. Both of the modified versions include a direct current DC-to-DC step-down converter [302], a switch indicated by a dashed box [310], and an element indicated by a dashed box [324] being configured for storage of potential energy in an electric field and having a T-On voltage [V-4]. In the modified examples [300] of the SMPS integrated circuit, the SMPS [300] is configured to receive a DC input current [I-a] having an input voltage [V-1] and to output, through an output load [320], a DC output current [I-b] having an output voltage [V-2]. Also in the modified examples [300] of the SMPS integrated circuit, the SMPS is configured to operate in a boundary conduction mode by applying a pulse-width-modulated voltage [V-3] to the switch [310] for controlling a duty cycle of the DC output current [I-b], the duty cycle having an on-time period (T-On) and an off-time period (T-Off).

Further in a first one of the two examples of modified versions, the SMPS integrated circuit [300] is configured for setting a maximum T-On voltage [V-4] of the element [324]. In this example, the SMPS integrated circuit [300] is configured to monitor the input voltage [V-1] by reducing the input voltage [V-1] to a signal voltage [V-5] being within a selected voltage signal range. Also in this example, the SMPS integrated circuit [300] is configured to convert the signal voltage [V-5] to a signal current [I-d] having a current signal value being within a selected current signal range representing the selected voltage signal range. The SMPS integrated circuit [300] in this example is configured to generate a T-On current [I-c] having an amperage taking into account the current signal value to set the on-time period (T-On) of the duty cycle. Further in this example, the SMPS integrated circuit [300] is configured for causing the T-On current [I-c] to store potential energy in the element [324]

during the T-On period, while causing the SMPS integrated circuit [300] to monitor the T-On voltage [V-4] of the element [324]. Additionally in this example, the SMPS integrated circuit [300] is configured to initiate the T-Off period when the potential energy stored in the element [324] reaches the maximum T-On voltage [V-4].

Further in a second one of the two examples of modified versions, the SMPS integrated circuit [300] is configured for causing a T-On current [I-c] to store potential energy in the element [324] during the T-On period while monitoring a T-On voltage [V-4] of the element [324]. Also in this example, the SMPS integrated circuit [300] is configured to monitor the input voltage [V-1] by reducing the input voltage [V-1] to a signal voltage [V-5] being within a selected voltage signal range. Additionally in this example, the SMPS integrated circuit [300] is configured to set a maximum T-On voltage [V-4] taking into account the signal voltage [V-5]. Additionally in this example, the SMPS integrated circuit [300] is configured to initiate the T-Off period when the potential energy stored in the element [324] reaches the maximum T-On voltage [V-4].

In some examples of either of the two modified SMPS integrated circuits, the element [324] configured for storage of potential energy in the electric field may include a T-On capacitor [324]. In further examples, either of the two modified SMPS integrated circuits [300] may be in the form of a microcontroller, an application-specific integrated circuit (ASIC), a digital signal processor (DSP), or a field-programmable gate array (FPGA). In additional examples, either of the two modified SMPS integrated circuits may further include a voltage-to-current converter [326] being configured to receive the signal voltage [V-5] and to output an error correction voltage [V-7] for generating the signal current [I-d] as defining a transconductance of the voltage-to-current converter [326]. In other examples, either of the two modified SMPS integrated circuits may be configured to receive the DC input current [I-a] with the input voltage [V-1] as having a root-mean-square (rms) value of the input voltage [V-1] being within a range of between about 100 volts and about 277 volts. In some examples, either of the two modified SMPS integrated circuits may be configured for regulating the output voltage [V-2] independently of the input voltage [V-1]. In further examples of the two modified SMPS integrated circuits [300], the DC-to-DC step-down converter [302] may include an inductor [360] having a first end [362] and a second end [364]; and the switch [310] may include a transistor [310] having a channel [312] being coupled between a cathode [314] and an anode [316], the anode [316] being coupled with a grounded current sense resistor [318]. Also in these examples, either of the two modified SMPS integrated circuits [300] may be configured for receiving the DC input current [I-a] at an input terminal [304], and for causing the DC output current [I-b] to flow from the positive output terminal [306] through an output load [320] to a negative output terminal [308]; and the first end [362] of the inductor [360] may be coupled with the negative output terminal [308]; and the second end [364] of the inductor [360] may be coupled at another node [366] with the cathode [314] of the transistor [310]. Additionally in the examples of the two modified SMPS integrated circuits [300], the DC-to-DC step-down converter [302] may include a freewheel diode [368] being coupled between the input terminal [304] and the another node [366] and being coupled with the cathode [314] of the transistor [310]; and the DC-to-DC step-down converter [302] may include an output capacitor [370] being coupled between the positive output terminal [306] and the negative output terminal [308]. In other examples of these two modified versions of the SMPS integrated circuit, the DC-to-DC step-down converter [302] may include a buck converter circuit, or a step-down buck-boost converter circuit (not shown), or a Sepic converter circuit (not shown), or a auk converter circuit (not shown). In some examples, either of the two examples of modified SMPS integrated circuits [300] may be configured for applying the pulse-width-modulated voltage [V-3] as being in phase with the input voltage [V-1].

Figure 4:
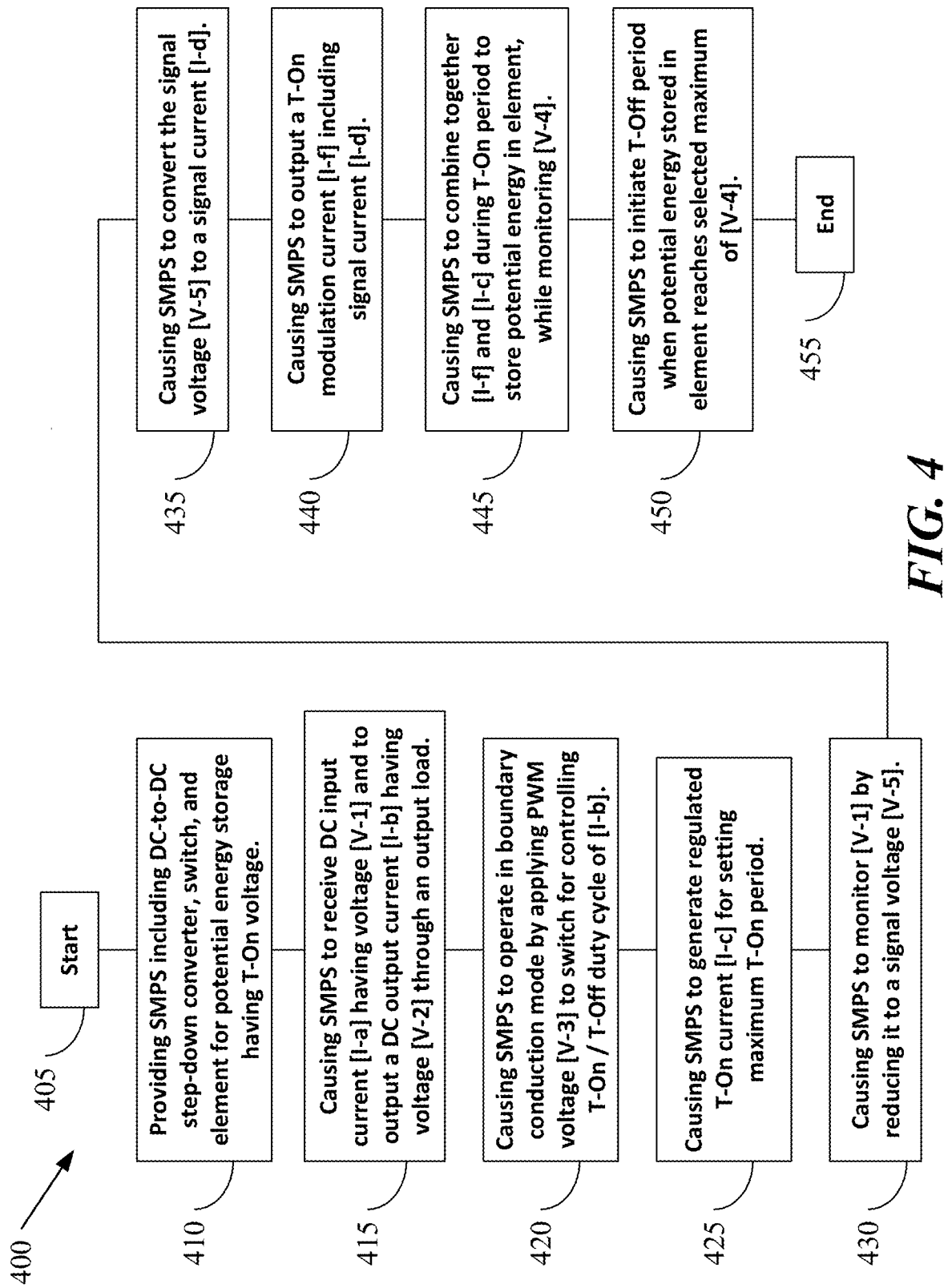
FIG. 4 is a flow diagram showing examples [400] of an implementation of a method of operating a switched-mode power supply (SMPS).

FIG. 4 is a flow diagram showing examples [400] of an implementation of a method of operating a switched-mode power supply (SMPS). It is understood throughout this specification that the examples [400] of a method of operating a switched-mode power supply may include any combination of the features that are discussed herein in connection with the examples [100], [200] of switched-mode power supplies, or that are discussed herein in connection with the examples [300] of switched-mode power supply integrated circuits, or that are discussed herein in connection with these examples [400] of methods of operating a switched-mode power supply. Accordingly, the entireties of the discussions herein of the examples [100], [200] of switched-mode power supplies, and of the examples [300] of the switched-mode power supply integrated circuit, are hereby incorporated in this discussion of the examples [400] of the methods of operating a switched-mode power supply.

As shown in FIG. 4, the examples [400] of the implementation of the methods of operating a switched-mode power supply start at step [405]. In the examples [400] of the method of operating a switched-mode power supply, step [410] includes providing an SMPS [100], [200], [300] including a direct current (DC)-to-DC step-down converter [102], [202], [302], and a switch [110], [210], [310], and an element [124], [224], [324] being configured for storage of potential energy in an electric field and having a T-On voltage [V-4].

Step [415] of the examples [400] of the method of operating a switched-mode power supply includes causing the SMPS [100], [200], [300] to receive a DC input current [I-a] having an input voltage [V-1] and to output, through an output load [120], [220], [320], a DC output current [I-b] having an output voltage [V-2].

In the examples [400] of the method of operating a switched-mode power supply, step [420] includes causing the SMPS [100], [200], [300] to operate in a boundary conduction mode by applying a pulse-width-modulated voltage [V-3] to the switch [110], [210], [310] for controlling a duty cycle of the DC output current [I-b], the duty cycle having an on-time period (T-On) and an off-time period (T-Off).

Step [425] of the examples [400] of the method of operating a switched-mode power supply includes causing the SMPS [100], [200], [300] to generate a regulated T-On current [I-c] for setting a maximum limit of the on-time period (T-On) of the duty cycle.

In the examples [400] of the method of operating a switched-mode power supply, step [430] includes causing the SMPS [100], [200], [300] to monitor the input voltage [V-1] by reducing the input voltage [V-1] to a signal voltage [V-5] being within a selected voltage signal range.

Step [435] of the examples [400] of the method of operating a switched-mode power supply includes causing the SMPS [100], [200], [300] to convert the signal voltage [V-5] to a signal current [I-d] having a current signal value being within a selected current signal range representing the selected voltage signal range.

In the examples [400] of the method of operating a switched-mode power supply, step [440] includes causing the SMPS [100], [200], [300] to output a T-On modulation current [I-f] including the signal current [I-d].

Step [445] of the examples [400] of the method of operating a switched-mode power supply includes causing the SMPS [100], [200], [300] to combine together the T-On modulation current [I-f] with the regulated T-On current [I-c] during the T-On period to store potential energy in the element [124], [224], [324] while causing the SMPS [100], [200], [300] to monitor the T-On voltage [V-4] of the element [124], [224], [324].

In the examples [400] of the method of operating a switched-mode power supply, step [450] includes causing the SMPS [100], [200], [300] to initiate the T-Off period when the potential energy stored in the element [124], [224], [324] reaches a selected maximum limit of the T-On voltage [V-4]. In the examples [400], the method of operating a switched-mode power supply may end at step [455].

In some examples [400] of the method of operating a switched-mode power supply, step [410] may include providing the SMPS [100], [200], [300] as being an integrated circuit in the form of: a microcontroller; an application-specific integrated circuit (ASIC); a digital signal processor (DSP); or a field-programmable gate array (FPGA).

In some examples [400] of the method of operating a switched-mode power supply, step [410] may further include providing a T-On capacitor [124], [224], [324] as being the element configured for storage of potential energy in the electric field.

In further examples [400] of the method of operating a switched-mode power supply, step [410] may include providing a voltage-to-current converter [126], [226], [326]; and causing the SMPS [100], [200], [300] to convert the signal voltage [V-5] to a signal current [I-d] in step [435] may further include causing the voltage-to-current converter [126], [226], [326] to output an error correction voltage [V-7] for generating the signal current [I-d] as defining a transconductance of the voltage-to-current converter [126], [226], [326]. In some examples [400] of the method of operating a switched-mode power supply, providing a voltage-to-current converter [126], [226], [326] in step [410] may include providing a transconductance amplifier [144], [244], [344]. In further examples [400] of the method of operating a switched-mode power supply, providing a transconductance amplifier [144], [244], [344] in step [410] may include providing the transconductance amplifier [144], [244], [344] as including a single-supply operational amplifier [146], [246], [346] having a positive input terminal [148], [248], [348] and a negative input terminal [150], [250], [350] and including an amplifier output terminal [128], [228], [328].

Additionally in those examples [400] of the method of operating a switched-mode power supply, providing the transconductance amplifier [144], [244], [344] in step [410] may include providing the signal voltage [V-5] as being coupled with the positive input terminal [148], [248], [348], and the negative input terminal [150], [250], [350] being coupled in a feedback loop [152], [252], [352] with another anode [136], [236], [336] of another transistor [130], [230], [330] having another cathode [134], [234], [334] and being coupled with a grounded precision resistor [138], [238], [338] for generating a transconductance voltage [V-6], and the output terminal [128], [228], [328] being configured for applying the error correction voltage [V-7] to another channel [132], [232], [332] of the another transistor [130] [230], [332]. Also in those examples [400] of the method of operating a switched-mode power supply, providing the transconductance amplifier [144], [244], [344] in step [410] may further include providing the precision resistor [138], [238], [338] as being coupled in series with a fixed voltage reference [154], [254], [354] having a fixed voltage [V-9] contributing to the signal current [I-d] appearing at the another anode [136], [236], [336]. In some of those examples [400] of the method of operating a switched-mode power supply, providing the transconductance amplifier [144], [244], [344] in step [410] may still further include providing the fixed voltage reference [138], [238], [338] as including a shunt voltage reference circuit [154], [254], [354].

In additional examples [400] of the method of operating a switched-mode power supply, providing the transconductance amplifier [144], [244], [344] in step [410] may further include selecting the fixed voltage [V-9] as being within a range having a lower limit of about one (1) volt and having an upper limit of about a supply voltage [V-8] minus one (1) volt, appearing between the precision resistor [138], [238], [338] and the shunt voltage reference circuit [154], [254], [354].

In some examples [400] of the method of operating a switched-mode power supply, the regulated supply current [I-e] having the supply voltage [V-8] may be internally generated by a function [VCC] of a controller [122], [222]. In other examples [400] of the method of operating a switched-mode power supply, the regulated supply current [I-e] having the supply voltage [V-8] may be otherwise generated by a [VCC] function (not shown). In some examples [400] of the method of operating a switched-mode power supply, the pulse-width-modulated voltage [V-3] may be internally generated by a function [PWM] of a controller [122], [222]. In other examples [400] of the method of operating a switched-mode power supply, the pulse-width-modulated voltage [V-3] may be otherwise generated by a [PWM] function (not shown). In some examples [400] of the method of operating a switched-mode power supply, the regulated T-On current [I-c] may be internally generated by a function [T-On] of a controller [122], [222]. In other examples [400] of the method of operating a switched-mode power supply, the regulated T-On current [I-c] may be otherwise generated by a [T-On] function (not shown).

In some examples [400] of the method of operating a switched-mode power supply, providing the transconductance amplifier [144], [244], [344] in step [410] may further include selecting the fixed voltage [V-9] as being within a range of between about one (1) volt and about eleven (11) volts, appearing between the precision resistor [138], [238], [338] and the shunt voltage reference circuit [154], [254], [354]. In other examples [400] of the method of operating a switched-mode power supply, providing the transconductance amplifier [144], [244], [344] in step [410] may further include selecting the fixed voltage [V-9] as being about 1.25 volts, appearing between the precision resistor [138], [238], [338] and the shunt voltage reference circuit [154], [254], [354].

In further examples [400] of the method of operating a switched-mode power supply, causing the SMPS [100], [200], [300] to output a T-On modulation current [I-f] at step [440] may include combining a regulated supply current [I-e] having a supply voltage [V-8] together with the signal current [I-d] as forming the T-On modulation current [I-f]. In other examples [400] of the method of operating a switched-mode power supply, step [440] may include selecting the supply voltage [V-8] of the regulated supply current [I-e] to be within a range of between about eight (8) volts and about fourteen (14) volts.

In additional examples [400] of the method of operating a switched-mode power supply, step [410] may include providing a current mirror [139], [239], [339]; and causing the SMPS [100], [200], [300] to output a T-On modulation current [I-f] in step [440] may include causing the current mirror [139], [239], [339] to receive and combine the regulated supply current [I-e] together with the signal current [I-d] as forming the T-On modulation current [I-f].

In further examples [400] of the method of operating a switched-mode power supply, step [410] may include providing a current mirror [139], [239], [339]; and causing the SMPS [100], [200], [300] to combine together the T-On modulation current [I-f] with the regulated T-On current [I-c] in step [445] may include causing the current mirror [139], [239], [339] to receive and combine the T-On modulation current [I-f] together with the regulated T-On current [I-c].

In some examples [400] of the method of operating a switched-mode power supply, step [410] may include providing a current mirror [139], [239], [339]; and causing the SMPS [100], [200], [300] to monitor the input voltage [V-1] in step [430] may include reducing the input voltage [V-1] to the selected voltage signal range as being between about one (1) volt and about five (5) volts. In further examples [400] of the method of operating a switched-mode power supply, step [410] may include providing a current mirror [139], [239], [339]; and causing the SMPS [100], [200], [300] to monitor the input voltage [V-1] in step [430] may include reducing the input voltage [V-1] to the selected voltage signal range as being between about 0.3 volt and about 1.2 volts.

In some examples [400] of the method of operating a switched-mode power supply, causing the SMPS [100], [200], [300] to monitor the input voltage [V-1] at step [430] by reducing the input voltage [V-1] to a signal voltage [V-5] may include providing a voltage divider [125], [225], [325]; and providing the voltage divider [125], [225], [325] may include providing the voltage divider [125], [225], [325] as having, for example, a first resistor [140], [240], [340] having a connection [127], [227], [337] in series with a second resistor [142], [242], [342], with the input voltage [V-1] being applied across the resistors [140], [142], [240], [242], [340], [342] and the signal voltage [V-5] appearing at the connection [127], [227], [327] between them.

In additional examples [400] of the method of operating a switched-mode power supply, causing the SMPS [100], [200], [300] to receive the DC input current [I-a] in step [415] may include selecting the input voltage [V-1] as having a root-mean-square (rms) value of the input voltage [V-1] being within a range of between about 100 volts and about 277 volts. In other examples [400] of the method of operating a switched-mode power supply, causing the SMPS [100], [200], [300] to output the DC output current [I-b] in step [415] may include regulating the output voltage [V-2] independently of the input voltage [V-1].

In other examples [400] of the method of operating a switched-mode power supply, reducing the input voltage [V-1] to a signal voltage [V-5] in step [430] may include selecting the voltage signal range as being between about one (1) volt and about five (5) volts; and converting the signal voltage [V-5] to a signal current [I-d] in step [435] may include selecting the current signal range as having a magnitude being within a representative selected range of between about one hundred micro-amps (100 µA) and about five hundred micro-amps (500 µA). In further examples [400] of the method of operating a switched-mode power supply, causing the SMPS [100], [200], [300] to initiate the T-Off period in step [450] when the potential energy stored in the element [124], [224], [324] reaches a selected maximum limit of the T-On voltage [V-4] may include selecting the maximum limit of the T-On voltage [V-4] as being within a range of between about zero (0) volts and about ten (10) volts. In some of those examples [400] of the method of operating a switched-mode power supply, causing the SMPS [100], [200], [300] to initiate the T-Off period in step [450] when the potential energy stored in the element [124], [224], [324] reaches a selected maximum limit of the T-On voltage [V-4] may include selecting the maximum limit of the T-On voltage [V-4] as being within a range of between about one (1) volt and about four (4) volts. In further examples [400] of the method of operating a switched-mode power supply, causing the SMPS [100], [200], [300] to initiate the T-Off period in step [450] when the potential energy stored in the element [124], [224], [324] reaches a selected maximum limit of the T-On voltage [V-4] may include selecting the maximum limit of the T-On voltage [V-4] as being about four (4) volts.

In additional examples [400] of the method of operating a switched-mode power supply, providing the DC-to-DC step-down converter in step [410] may include providing an inductor [160], [260], [360] having a first end [162], [262], [362] and having a second end [164], [264], [364]. In further examples [400] of the method of operating a switched-mode power supply, providing the switch [110], [210], [310] in step [410] may include providing a transistor [110], [210], [310] having a channel [112], [212], [312] being coupled between a cathode [114], [214], [314] and an anode [116], [216], [316], the anode [116], [216], [316] being coupled with a grounded current sense resistor [118], [218], [318]. In additional examples [400] of the method of operating a switched-mode power supply, causing the SMPS [100], [200], [300] to receive the DC input current [I-a] in step [415] may include providing an input terminal [104], [204], [304] in step [410]; and wherein causing the SMPS [100], [200], [300] to output the DC output current [I-b] in step [415] may include providing a positive output terminal [106], [206], [306] and a negative output terminal [108], [208], [308] in step [410]. In further examples [400] of the method of operating a switched-mode power supply, causing the SMPS [100], [200], [300] to output the DC output current [I-b] in step [415] may include causing the DC output current [I-b] to flow from the positive output terminal [106], [206], [306] through the output load [120], [220], [320] to the negative output terminal [108], [208], [308]. In additional examples [400] of the method of operating a switched-mode power supply, providing the DC-to-DC step-down converter in step [410] may include providing the inductor [160], [260], [360] with the first end [162], [262], [362] of the inductor [160], [260], [360] being coupled to the negative output terminal [108], [208], [308], and with the second end [164], [264], [364] of the inductor [160], [260], [360] being coupled at another node [166], [266], [366] with the cathode [114], [214], [314] of the transistor [110], [210], [310]. In further examples [400] of the method of operating a switched-mode power supply, providing the DC-to-DC step-down converter in step [410] may include providing a freewheel diode [168], [268], [368] being coupled between the input terminal [104], [204], [304] and the another node [166], [266], [366], and being coupled with the cathode [114], [214], [314] of the transistor [110], [210], [310]. In further examples [400] of the method of operating a switched-mode power supply, providing the DC-to-DC step-down converter in step [410] may include providing an output capacitor [170], [270], [370] being coupled between the positive output terminal [106], [206], [306] and the negative output terminal [108], [208], [308].

In some examples [400] of the method of operating a switched-mode power supply, causing the SMPS [100], [200], [300] to operate in the boundary conduction mode in step [420] may include causing the DC-to-DC step-down converter [102], [202], [302] to charge the inductor [160], [260], [360] and charge the output capacitor [170], [270], [370] during the T-On period; and to discharge the inductor [160], [260], [360] and discharge the output capacitor [170], [270], [370] during the T-Off period. In further examples [400] of the method of operating a switched-mode power supply, causing the SMPS [100], [200], [300] to operate in the boundary conduction mode in step [420] may include causing the SMPS [100], [200], [300] to initiate the T-On period when the inductor [160], [260], [360] is discharged.

In further examples [400] of the method of operating a switched-mode power supply, providing the DC-to-DC step-down converter in step [410] may include providing the DC-to-DC step-down converter [102], [202], [302] as including a buck converter circuit, or a step-down buck-boost converter circuit (not shown), or a Sepic converter circuit (not shown), or a auk converter circuit (not shown). In additional examples [400] of the method of operating a switched-mode power supply, causing the SMPS [100], [200], [300] to operate in the boundary conduction mode in step [420] may include applying the pulse-width-modulated voltage [V-3] as being in phase with the input voltage [V-1]. In further examples [400] of the method of operating a switched-mode power supply, causing the SMPS [100], [200], [300] to operate in the boundary conduction mode in step [420] may include applying the pulse-width-modulated voltage [V-3] as being in a peak current mode.

In further examples [400] of the method of operating a switched-mode power supply, providing the SMPS [100], [200], [300] in step [410] may include providing a rectifying circuit [172], [272], [372]; and causing the SMPS [100], [200], [300] to receive the DC input current [I-a] at step [415] may include rectifying a mains alternating current (AC) input voltage [176], [276], [376]. In additional examples [400] of the method of operating a switched-mode power supply, providing the rectifying circuit [172], [272], [372] in step [410] may include providing the rectifying circuit [172], [272], [372] as including a full-wave rectifier [174], [274], [374]. In some of those examples [400] of the method of operating the switched-mode power supply, the rectified input voltage [V-1] may have a root-mean-square (rms) value of the input voltage [V-1] as being within a range of between about 100 volts and about 277 volts.

In further examples [400] of the method of operating a switched-mode power supply, causing the SMPS [100], [200], [300] to output the DC output current [I-b] through an output load [120], [220], [320] in step [415] may include selecting the output load [120], [220], [320] as including a semiconductor light-emitting device.

The examples [100], [200] of switched-mode power supplies, and the examples [300] of switched-mode power supply integrated circuits, and the examples [400] of methods of operating a switched-mode power supply, may generally be utilized in end-use applications for switched-mode power supplies (SMPS) where there is a need for universal compatibility of the SMPSs with commonly-available mains alternating current (AC) input voltages and corresponding commonly-available rectified DC input voltages. As an example, the SMPSs and methods disclosed herein may be configured for universal compatibility with AC input voltages, and corresponding rectified DC input voltages, having a root-mean-square (rms) value as being within a range of between about 100 volts and about 277 volts. It is understood, however, that the universal compatibility of the SMPSs and methods disclosed herein may be extended to other AC input voltages and corresponding rectified DC input voltages.

While the present invention has been disclosed in a presently defined context, it will be recognized that the present teachings may be adapted to a variety of contexts consistent with this disclosure and the claims that follow. For example, the lighting systems shown in the figures and discussed above can be adapted in the spirit of the many optional parameters described.

We claim:

1. A switched-mode power supply (SMPS) integrated circuit, comprising:
   a direct current (DC)-to-DC step-down converter having an input terminal, a positive output terminal, a negative output terminal, and a transistor having a channel being coupled between a cathode and an anode, the anode being coupled with a grounded current sense resistor; and the SMPS being configured for operation in a boundary conduction mode, and configured for receiving a DC input current having an input voltage at the input terminal, and configured for causing a DC output current having an output voltage to flow from the positive output terminal through an output load to the negative output terminal; and a controller, the controller being configured for applying a pulse-width-modulated voltage to the channel of the transistor for controlling a duty cycle of the DC output current, the duty cycle having an on-time period (T-On) and an off-time period (T-Off), the controller being coupled with a T-On capacitor having a T-On voltage, the controller being configured for charging the T-On capacitor during the T-On period by a regulated T-On current for setting a maximum limit of the T-On period, the controller being configured for initiating the T-Off period when the T-On capacitor becomes charged to a selected maximum limit of the T-On voltage;
   a voltage divider being coupled with the input terminal for receiving the input voltage and for reducing the input voltage to a signal voltage being within a selected voltage signal range;
   a voltage-to-current converter having a connection with the voltage divider, the voltage-to-current converter including another output terminal being coupled with another transistor having another channel being coupled between another cathode and another anode, the voltage-to-current converter including a grounded precision resistor configured for generating a transconductance voltage, the voltage-to-current converter being configured for inputting the signal voltage and for outputting an error correction voltage being applied to the another channel for generating a current signal appearing at the another anode and defining a transconductance of the voltage-to-current converter and having a current signal value being within a selected current signal range representing the selected voltage signal range; and
   a current mirror being coupled with the another cathode and being configured for receiving and combining a regulated supply current having a supply voltage together with the current signal as forming a T-On modulation current, with the current mirror being configured for causing the T-On modulation current to be combined with the regulated T-On current to charge the T-On capacitor.

2. The switched-mode power supply (SMPS) integrated circuit of claim 1, wherein the controller is configured for regulating the output voltage independently of the input voltage.

3. The switched-mode power supply (SMPS) integrated circuit of claim 1, wherein the voltage-to-current converter includes a transconductance amplifier.

4. The switched-mode power supply (SMPS) integrated circuit of claim 3, wherein the transconductance amplifier includes a single-supply operational amplifier having a positive input terminal and a negative input terminal and an amplifier output terminal, the signal voltage being coupled with the positive input terminal, the negative input terminal being coupled in a feedback loop with the another anode of the another transistor and being coupled with the grounded precision resistor for defining the transconductance, and the output terminal being configured for applying the error correction voltage to the another channel of the another transistor.

5. The switched-mode power supply (SMPS) integrated circuit of claim 1, wherein the DC-to-DC step-down converter includes an inductor having a first end and a second end; and wherein the first end of the inductor is coupled with the negative output terminal, and wherein the second end of the inductor is coupled at another node with the cathode of the transistor; and wherein the DC-to-DC step-down converter includes a freewheel diode being coupled between the input terminal and the another node and being coupled with the cathode of the transistor; and wherein the DC-to-DC step-down converter includes an output capacitor being coupled between the positive output terminal and the negative output terminal; and wherein the controller is configured for initiating the T-On period when the inductor is discharged.

6. The switched-mode power supply (SMPS) integrated circuit of claim 5, wherein the DC-to-DC step-down converter is configured for charging the inductor and charging the output capacitor during the T-On period; and wherein the DC-to-DC step-down converter is configured for discharging the inductor and discharging the output capacitor during the T-Off period.

7. A switched-mode power supply (SMPS) integrated circuit, comprising:
a direct current (DC)-to-DC step-down converter having an input terminal, a positive output terminal, and a negative output terminal, the SMPS being configured for operation in a boundary conduction mode, and configured for receiving a DC input current having an input voltage at the input terminal, and configured for causing a DC output current having an output voltage to flow from the positive output terminal through an output load to the negative output terminal; and configured for being integrated with a controller including a transistor having a channel being coupled between a cathode and an anode, the anode being coupled with a grounded current sense resistor, the controller being configured for applying a pulse-width-modulated voltage to the channel of the transistor for controlling a duty cycle of the DC output current, the duty cycle having an on-time period (T-On) and an off-time period (T-Off), the controller being coupled with a T-On capacitor having a T-On voltage, the controller being configured for charging the T-On capacitor during the T-On period by a regulated T-On current for setting a maximum limit of the T-On period, the controller being configured for initiating the T-Off period when the T-On capacitor becomes charged to a selected maximum limit of the T-On voltage;

a voltage divider being coupled with the input terminal for receiving the input voltage and for reducing the input voltage to a signal voltage being within a selected voltage signal range;

a voltage-to-current converter having a connection with the voltage divider, the voltage-to-current converter including another output terminal being coupled with another transistor having another channel being coupled between another cathode and another anode, the voltage-to-current converter including a grounded precision resistor configured for generating a transconductance voltage, the voltage-to-current converter being configured for inputting the signal voltage and for outputting an error correction voltage being applied to the another channel for generating a current signal appearing at the another anode and defining a transconductance of the voltage-to-current converter and having a current signal value being within a selected current signal range representing the selected voltage signal range; and a current mirror being coupled with the another cathode and being configured for receiving and combining a regulated supply current having a supply voltage together with the current signal as forming a T-On modulation current, with the current mirror being configured for causing the T-On modulation current to be combined with the regulated T-On current to charge the T-On capacitor.

8. The switched-mode power supply (SMPS) integrated circuit of claim 7, wherein the controller is configured for regulating the output voltage independently of the input voltage.

9. The switched-mode power supply (SMPS) integrated circuit of claim 7, wherein the voltage-to-current converter includes a transconductance amplifier.

10. The switched-mode power supply (SMPS) integrated circuit of claim 9, wherein the transconductance amplifier includes a single-supply operational amplifier having a positive input terminal and a negative input terminal and an amplifier output terminal, the signal voltage being coupled with the positive input terminal, the negative input terminal being coupled in a feedback loop with the another anode of the another transistor and being coupled with the grounded precision resistor for defining the transconductance, and the output terminal being configured for applying the error correction voltage to the another channel of the another transistor.

11. The switched-mode power supply (SMPS) integrated circuit of claim 7, wherein the DC-to-DC step-down converter includes an inductor having a first end and a second end; and wherein the first end of the inductor is coupled with the negative output terminal, and wherein the second end of the inductor is coupled at another node with the cathode of the transistor; and wherein the DC-to-DC step-down converter includes a freewheel diode being coupled between the input terminal and the another node and being coupled with the cathode of the transistor; and wherein the DC-to-DC step-down converter includes an output capacitor being coupled between the positive output terminal and the negative output terminal; and wherein the controller is configured for initiating the T-On period when the inductor is discharged.

12. The switched-mode power supply (SMPS) integrated circuit of claim 11, wherein the DC-to-DC step-down converter is configured for charging the inductor and charging the output capacitor during the T-On period; and wherein the DC-to-DC step-down converter is configured for discharging the inductor and discharging the output capacitor during the T-Off period.

13. A switched-mode power supply (SMPS), comprising: a direct current (DC)-to-DC step-down converter, a switch, and an element being configured for storage of potential energy in an electric field and having a T-On voltage; wherein the SMPS is configured to receive a DC input current having an input voltage and to output, through an output load, a DC output current having an output voltage; wherein the SMPS is configured to operate in a boundary conduction mode by applying a pulse-width-modulated voltage to the switch for controlling a duty cycle of the DC output current, the duty cycle having an on-time period (T-On) and an off-time period (T-Off); wherein the SMPS is configured to generate a regulated T-On current for setting a maximum limit of the on-time period (T-On) of the duty cycle; wherein the SMPS is configured to monitor the input voltage by reducing the input voltage to a signal voltage being within a selected voltage signal range; wherein the SMPS is configured to convert the signal voltage to a current signal having a current signal value being within a selected current signal range representing the selected voltage signal range; wherein the SMPS is configured to output a T-On modulation current including the current signal; wherein the SMPS is configured to combine together the T-On modulation current with the regulated T-On current during the T-On period to store potential energy in the element, while causing the SMPS to monitor the T-On voltage of the element; and wherein the SMPS is configured to initiate the T-Off period when the potential energy stored in the element reaches a selected maximum limit of the T-On voltage.

14. The switched-mode power supply of claim 13, wherein the element configured for storage of potential energy in the electric field includes a T-On capacitor.

15. The switched-mode power supply of claim 13, wherein the SMPS is configured for combining a regulated supply current having a supply voltage together with the current signal as forming the T-On modulation current.

16. The switched-mode power supply of claim 13, wherein the SMPS is configured for regulating the output voltage independently of the input voltage.

17. The switched-mode power supply of claim 13, further including a voltage-to-current converter including a transconductance amplifier, the voltage-to-current converter being configured to receive the signal voltage and to output an error correction voltage for generating the current signal as defining a transconductance of the voltage-to-current converter.

18. The switched-mode power supply of claim 17, wherein the transconductance amplifier includes a single-supply operational amplifier having a positive input terminal and a negative input terminal and an amplifier output terminal, the signal voltage being coupled with the positive input terminal, the negative input terminal being coupled in a feedback loop with another anode of another transistor and being coupled with a grounded precision resistor for generating a transconductance voltage, and the output terminal being configured for applying the error correction voltage to another channel of the another transistor.

19. The switched-mode power supply (SMPS) of claim 13, wherein the DC-to-DC step-down converter includes an inductor having a first end and a second end; and wherein the switch includes a transistor having a channel being coupled between a cathode and an anode, the anode being coupled with a grounded current sense resistor; and wherein the SMPS is configured for receiving the DC input current at an input terminal, and for causing the DC output current to flow from the positive output terminal through an output load to a negative output terminal; and wherein the first end of the inductor is coupled with the negative output terminal; and wherein the second end of the inductor is coupled at another node with the cathode of the transistor; and wherein the DC-to-DC step-down converter includes a freewheel diode being coupled between the input terminal and the another node and being coupled with the cathode of the transistor; and wherein the DC-to-DC step-down converter includes an output capacitor being coupled between the positive output terminal and the negative output terminal.

20. The switched-mode power supply of claim 19, wherein the SMPS is configured for initiating the T-On period when the inductor is discharged; and wherein the SMPS is configured for causing the DC-to-DC step-down converter to: charge the inductor and charge the output capacitor during the T-On period; and to discharge the inductor and discharge the output capacitor during the T-Off period.

21. The switched-mode power supply of claim 13 further including a current mirror being configured to receive and combine the regulated supply current together with the current signal as forming the T-On modulation current; wherein the current mirror is configured to receive and combine the T-On modulation current together with the regulated T-On current.

22. A switched-mode power supply (SMPS), comprising: a direct current (DC)-to-DC step-down converter, a switch, and an element being configured for storage of potential energy in an electric field and having a T-On voltage; wherein the SMPS is configured to receive a DC input current having an input voltage and to output, through an output load, a DC output current having an output voltage; wherein the SMPS is configured to operate in a boundary conduction mode by applying a pulse-width-modulated voltage to the switch for controlling a duty cycle of the DC output current, the duty cycle having an on-time period (T-On) and an off-time period (T-Off), the SMPS setting a maximum T-On voltage of the element; wherein the SMPS is configured to monitor the input voltage by reducing the input voltage to a signal voltage being within a selected voltage signal range; wherein the SMPS is configured to convert the signal voltage to a current signal having a current signal value being within a selected current signal range representing the selected voltage signal range; wherein the SMPS is configured to generate a T-On current having an amperage taking into account the current signal value to set the on-time period (T-On) of the duty cycle; wherein the SMPS is configured for causing the T-On current to store potential energy in the element during the T-On period, while causing the SMPS to monitor the T-On voltage of the element; and wherein the SMPS is configured to initiate the T-Off period when the potential energy stored in the element reaches the maximum T-On voltage.

23. The switched-mode power supply of claim 22, wherein the element configured for storage of potential energy in the electric field includes a T-On capacitor.

24. The switched-mode power supply of claim 22, wherein the SMPS is configured for regulating the output voltage independently of the input voltage.

25. The switched-mode power supply of claim 22, further including a voltage-to-current converter including a transconductance amplifier, the voltage-to-current converter being configured to receive the signal voltage and to output an error correction voltage for generating the current signal as defining a transconductance of the voltage-to-current converter.

26. The switched-mode power supply (SMPS) of claim 22, wherein the DC-to-DC step-down converter includes an inductor having a first end and a second end; and wherein the switch includes a transistor having a channel being coupled between a cathode and an anode, the anode being coupled with a grounded current sense resistor; and wherein the SMPS is configured for receiving the DC input current at an input terminal, and for causing the DC output current to flow from the positive output terminal through an output load to a negative output terminal; and wherein the first end of the inductor is coupled with the negative output terminal; and wherein the second end of the inductor is coupled at another node with the cathode of the transistor; and wherein the DC-to-DC step-down converter includes a freewheel diode being coupled between the input terminal and the another node and being coupled with the cathode of the transistor; and wherein the DC-to-DC step-down converter includes an output capacitor being coupled between the positive output terminal and the negative output terminal.

27. The switched-mode power supply of claim 26, wherein the SMPS is configured for initiating the T-On period when the inductor is discharged; and wherein the SMPS is configured for causing the DC-to-DC step-down converter to: charge the inductor and charge the output capacitor during the T-On period; and to discharge the inductor and discharge the output capacitor during the T-Off period.

28. A switched-mode power supply (SMPS), comprising: a direct current (DC)-to-DC step-down converter, a switch, and an element being configured for storage of potential energy in an electric field and having a T-On voltage; wherein the SMPS is configured to receive a DC input current having an input voltage and to output, through an output load, a DC output current having an output voltage; wherein the SMPS is configured to operate in a boundary conduction mode by applying a pulse-width-modulated voltage to the switch for controlling a duty cycle of the DC output current, the duty cycle having an on-time period (T-On) and an off-time period (T-Off); wherein the SMPS is configured for causing a T-On current to store potential energy in the element during the T-On period while monitoring a T-On voltage of the element; wherein the SMPS is configured to monitor the input voltage by reducing the input voltage to a signal voltage being within a selected voltage signal range; wherein the SMPS is configured to set a maximum T-On voltage taking into account the signal voltage; and wherein the SMPS is configured to initiate the T-Off period when the potential energy stored in the element reaches the maximum T-On voltage.

29. The switched-mode power supply of claim 28, wherein the element configured for storage of potential energy in the electric field includes a T-On capacitor.

30. The switched-mode power supply of claim 28, wherein the SMPS is configured for regulating the output voltage independently of the input voltage.

31. The switched-mode power supply of claim 28, further including a voltage-to-current converter including a transconductance amplifier, the voltage-to-current converter being configured to receive the signal voltage and to output an error correction voltage for generating the current signal as defining a transconductance of the voltage-to-current converter.

32. The switched-mode power supply (SMPS) of claim 28, wherein the DC-to-DC step-down converter includes an inductor having a first end and a second end; and wherein the switch includes a transistor having a channel being coupled between a cathode and an anode, the anode being coupled with a grounded current sense resistor; and wherein the SMPS is configured for receiving the DC input current at an input terminal, and for causing the DC output current to flow from the positive output terminal through an output load to a negative output terminal; and wherein the first end of the inductor is coupled with the negative output terminal; and wherein the second end of the inductor is coupled at another node with the cathode of the transistor; and wherein the DC-to-DC step-down converter includes a freewheel diode being coupled between the input terminal and the another node and being coupled with the cathode of the transistor; and wherein the DC-to-DC step-down converter includes an output capacitor being coupled between the positive output terminal and the negative output terminal.

33. The switched-mode power supply of claim 32, wherein the SMPS is configured for initiating the T-On period when the inductor is discharged; and wherein the SMPS is configured for causing the DC-to-DC step-down converter to: charge the inductor and charge the output capacitor during the T-On period; and to discharge the inductor and discharge the output capacitor during the T-Off period.

* * * * *